US012581008B2

(12) United States Patent
Chen et al.

(10) Patent No.: US 12,581,008 B2
(45) Date of Patent: Mar. 17, 2026

(54) CALL SERVICE BOOTSTRAPPING METHOD, ELECTRONIC DEVICE, AND STORAGE MEDIUM

(71) Applicant: HONOR DEVICE CO., LTD., Shenzhen (CN)

(72) Inventors: Jiazi Chen, Shenzhen (CN); Feng Ge, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/552,061

(22) PCT Filed: Dec. 26, 2022

(86) PCT No.: PCT/CN2022/142063
§ 371 (c)(1),
(2) Date: Sep. 22, 2023

(87) PCT Pub. No.: WO2023/207178
PCT Pub. Date: Nov. 2, 2023

(65) Prior Publication Data
US 2025/0080637 A1 Mar. 6, 2025

(30) Foreign Application Priority Data

Apr. 25, 2022 (CN) ......................... 202210492461.X

(51) Int. Cl.
*H04M 1/72409* (2021.01)
*H04M 1/72454* (2021.01)
(Continued)

(52) U.S. Cl.
CPC . *H04M 1/724095* (2022.02); *H04M 1/72454* (2021.01); *H04M 1/72472* (2021.01); *H04M 3/548* (2013.01); *H04W 4/16* (2013.01)

(58) Field of Classification Search
CPC ....... H04M 1/724095; H04M 1/72454; H04M 1/72472; H04M 1/72469; H04M 1/72403;
(Continued)

(56) References Cited

U.S. PATENT DOCUMENTS 12,045,446 B2 7/2024 Han
2020/0128132 A1 4/2020 Nguyen et al.
(Continued)

FOREIGN PATENT DOCUMENTS

CN 101453248 A 6/2009
CN 103873612 A 6/2014
(Continued)

*Primary Examiner* — Farid Seyedvosoghi
(74) *Attorney, Agent, or Firm* — Fish & Richardson P.C.

(57) ABSTRACT

This application provides a call service bootstrapping method, an electronic device, and a storage medium. The method includes: detecting, in response to an operation instruction generated when a phone application is enabled, whether a call function is enabled; switching a current user interface to a first bootstrapping interface if the call function is not enabled, the first bootstrapping interface including a first option; switching the first bootstrapping interface to a first dialing interface in response to an operation instruction generated when the first option is triggered; and switching the current user interface to the first dialing interface if the call function is enabled. According to this application, when a user enables the phone application, the user is bootstrapped to enable the call function. In this way, the user can also answer and make calls even if using an electronic device without a call function.

20 Claims, 21 Drawing Sheets

(51) Int. Cl.
*H04M 1/72472* (2021.01)
*H04M 3/54* (2006.01)
*H04W 4/16* (2009.01)

(58) Field of Classification Search
CPC ............. H04M 1/72412; H04M 3/548; H04M
2250/60; H04W 4/16; G06F 3/0481;
G06F 3/04817; G06F 3/04842; G06F
3/0487; G06F 3/0485
See application file for complete search history.

(56) References Cited

U.S. PATENT DOCUMENTS

| | | | | |
|---|---|---|---|---|
| 2021/0400091 | A1* | 12/2021 | Deng | .................. H04L 65/1069 |
| 2022/0004315 | A1* | 1/2022 | Zhang | .................. G06F 3/0482 |

FOREIGN PATENT DOCUMENTS

| | | | | | |
|---|---|---|---|---|---|
| CN | 105635478 | A | | 6/2016 | |
| CN | 113554857 | A | | 10/2021 | |
| CN | 113572731 | A | * | 10/2021 | ........ H04M 1/72412 |
| CN | 113905123 | A | | 1/2022 | |
| CN | 113961157 | A | | 1/2022 | |
| WO | 2019014881 | A1 | | 1/2019 | |

* cited by examiner

Phone

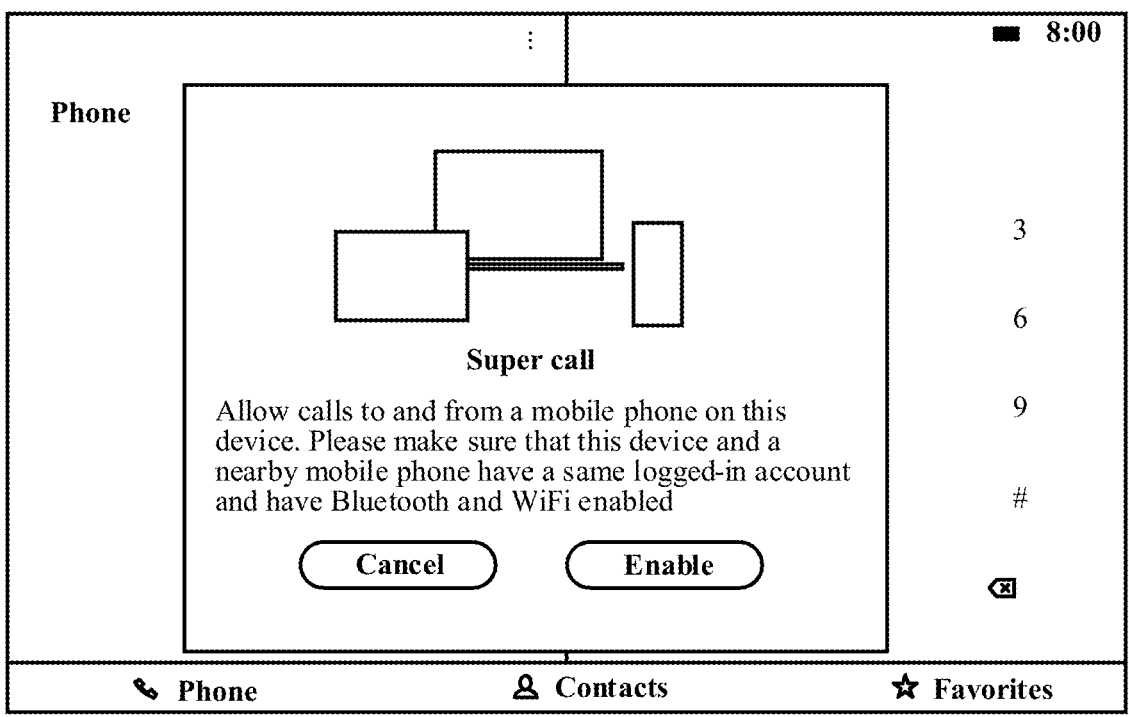

Super call

Allow calls to and from a mobile phone on this device. Please make sure that this device and a nearby mobile phone have a same logged-in account and have Bluetooth and WiFi enabled ( Cancel )          ( Enable )

3

6

9

⌫

📞 Phone                    👤 Contacts                    ⭐ Favorites

Phone

8:00

Mr. Zhang
Beijing Mobile          5 minutes ago   ①

Mr. Li
Beijing Unicom          6:30 PM   ①

Mr. Zhou
Shenzhen Telecom        10:26 AM   ①

Mr. Wang
Shenzhen Mobile         Yesterday   ①

|   |   |   |
|---|---|---|
| 1 | 2 | 3 |
| 4 | 5 | 6 |
| 7 | 8 | 9 |
| * | 0 | # |

📞                    ⌫

📞 Phone                    👤 Contacts                    ⭐ Favorites

FIG. 5B

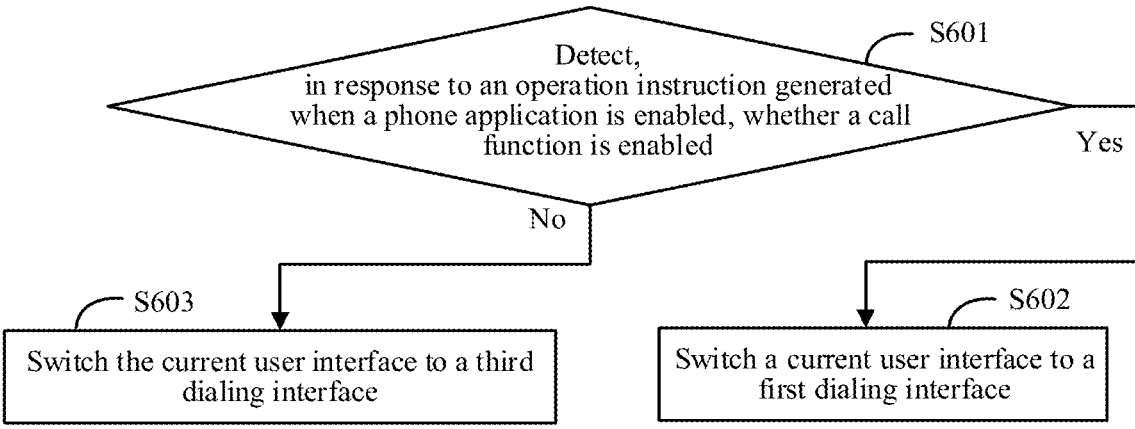

Detect,
in response to an operation instruction generated
when a phone application is enabled, whether a call
function is enabled

S601

Yes

No

S603

Switch the current user interface to a third
dialing interface

S602

Switch a current user interface to a
first dialing interface

FIG. 13

Phone  ⋮

■ 8:00

Enable the super call. Use this
device to make a phone call  ×
Enable

|  |  |  |
|---|---|---|
| 1 | 2 | 3 |
| 4 | 5 | 6 |
| 7 | 8 | 9 |
| * | 0 | # |

Mr. Zhang
Beijing Mobile  5 minutes ago  ①

Mr. Li
Beijing Unicom  6:30 PM  ①

Mr. Zhou
Shenzhen Telecom  10:26 AM  ①

Mr. Wang
Shenzhen Mobile  Yesterday  ①

✆ Phone      👤 Contacts      ☆ Favorites

FIG. 14

| Super call, connected to a mobile phone | Search | | | |
|---|---|---|---|---|
| Phone | Mr. Zhang  5 minutes ago ① Beijing Mobile | 1 | 2 | 3 |
| Contacts | Mr. Li  6:30 PM ① Beijing Unicom | 4 | 5 | 6 |
| | Mr. Zhou  10:26 AM ① Shenzhen Telecom | 7 | 8 | 9 |
| | Mr. Wang  Yesterday ① Shenzhen Mobile | * | 0 | # |

FIG. 16B

| Super call, connected to a mobile phone | Search | | | |
|---|---|---|---|---|
| Phone | Mr. Zhang  5 minutes ago ① Beijing Mobile | 1 | 2 | 3 |
| Contacts | Mr. Li  6:30 PM ① Beijing Unicom | 4 | 5 | 6 |
| | Mr. Zhou  10:26 AM ① Shenzhen Telecom | 7 | 8 | 9 |
| | Mr. Wang  Yesterday ① Shenzhen Mobile | * | 0 | # |

FIG. 16C

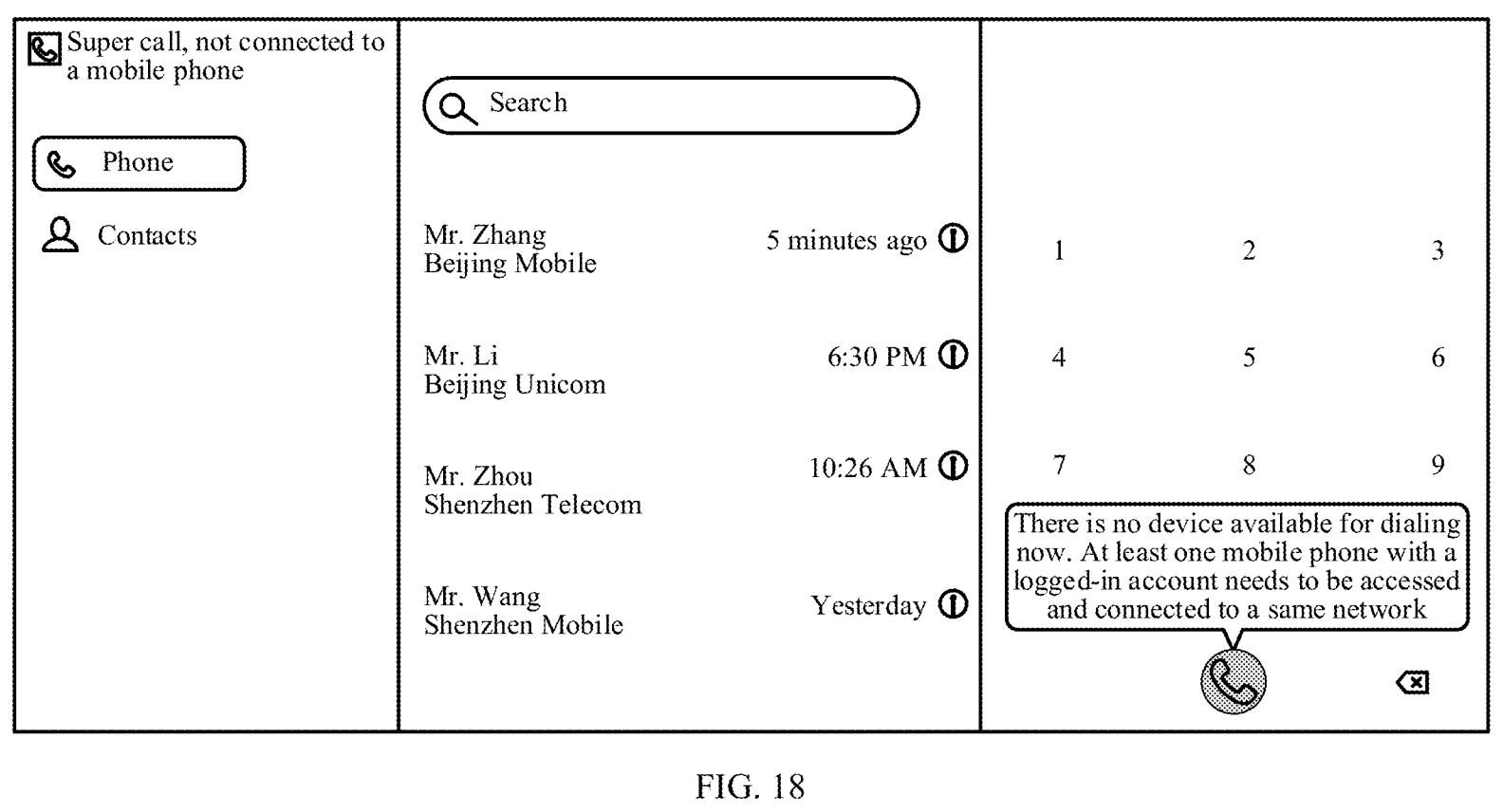

Super call, not connected to
a mobile phone

Phone

Contacts

Search

Mr. Zhang
Beijing Mobile     5 minutes ago

Mr. Li
Beijing Unicom     6:30 PM

Mr. Zhou
Shenzhen Telecom     10:26 AM

Mr. Wang
Shenzhen Mobile     Yesterday 1    2    3

4    5    6

7    8    9

There is no device available for dialing
now. At least one mobile phone with a
logged-in account needs to be accessed
and connected to a same network

FIG. 18

CALL SERVICE BOOTSTRAPPING METHOD, ELECTRONIC DEVICE, AND STORAGE MEDIUM

CROSS-REFERENCE TO RELATED APPLICATIONS

This application is a national stage of International Application No. PCT/CN2022/142063 filed on Dec. 26, 2022, which claims priority to Chinese Patent Application No. 202210492461.X, filed on Apr. 25, 2022. The disclosures of the aforementioned applications are hereby incorporated by reference in their entireties.

TECHNICAL FIELD

This application relates to the field of communication technologies, and in particular, to a call service bootstrapping method, an electronic device, and a storage medium.

BACKGROUND

According to a super call technology, a call function may be implemented across platforms, networks, and devices, and when a user is not near a mobile phone or it is inconvenient to use the mobile phone to answer or make a call, the user can answer or make the call through another device other than the mobile phone, to realize transfer of the call function. Some electronic devices such as notebook computers, tablet computers, and smart watches do not have phone functions. Due to the lack of bootstrapping functions, when using the electronic devices to answer or make calls based on the super call technology, the user may not know how to operate, thereby making it impossible to answer and make calls across the devices, which affects user experience.

SUMMARY

In view of the above content, there is a need to provide a call service bootstrapping method, an electronic device, and a storage medium, which can bootstrap a user to implement a call function by using an electronic device without the call function.

According to a first aspect, this application provides a call service bootstrapping method, including: detecting, in response to an operation instruction generated when a phone application is enabled, whether a call function is enabled; switching a current user interface to a first bootstrapping interface if the call function is not enabled, the first bootstrapping interface including a first option; switching the first bootstrapping interface to a first dialing interface in response to an operation instruction generated when the first option is triggered; and switching the current user interface to the first dialing interface if the call function is enabled. Through the above technical solution, when a user enables the phone application by using an electronic device without a communication card, the user can be bootstrapped to implement a super call function, which is convenient for the user to answer and make calls.

In a possible implementation, the first bootstrapping interface further includes a second option, and the method includes: switching the first bootstrapping interface to a second dialing interface in response to an operation instruction generated when the second option is triggered. Through the above technical solution, when the user cancels the bootstrapping and enters the first dialing interface, the user can be reminded that no call can be made through the second dialing interface.

In a possible implementation, the second dialing interface is an inactivated super call interface and includes a phone interface, a contacts interface, and a favorites interface, the phone interface including a prompt region and a dialing region, the prompt region including a function introduction and an enable option of a super call, the enable option being triggerable to display the first dialing interface, the dialing region including a plurality of numeric keys and an untriggerable dial key. Through the above technical solution, bootstrapping for re-enabling the super call function can be provided on the second dialing interface.

In a possible implementation, the first dialing interface is an activated super call interface and includes a phone interface, a contacts interface, and a favorites interface, the phone interface including a call log region and a dialing region, the call log region including contacts information, the dialing region including a plurality of numeric keys and a triggerable dial key. Through the above technical solution, it is convenient for the user to answer and make calls through the super call function.

In a possible implementation, the switching the current user interface to the first dialing interface if the call function is enabled includes: switching the current user interface to a second bootstrapping interface if the call function is enabled, where the second bootstrapping interface includes a function introduction and a function enabling description of a super call; and switching the second bootstrapping interface to the first dialing interface after the second bootstrapping interface is displayed for a preset time. Through the above technical solution, it is convenient for the user to understand functions and an enabling condition of the super call.

In a possible implementation, the method further includes: detecting, in response to the operation instruction generated when the first option on the first bootstrapping interface is triggered, whether a user account is logged into; switching the first bootstrapping interface to the first dialing interface if the user account is logged into; switching the first bootstrapping interface to an account login interface if the user account is not logged into; and switching the account login interface to the first dialing interface in response to an operation instruction generated by account login. Through the above technical solution, the user can be bootstrapped to log into an account when the user does not log into the account.

In a possible implementation, the method further includes: detecting, in response to the operation instruction generated when the phone application is enabled, whether a preset application is enabled; detecting, if the preset application is enabled, whether the call function is enabled; switching the current user interface to the first bootstrapping interface if the call function is not enabled; switching the first bootstrapping interface to the first dialing interface in response to the operation instruction generated when the first option on the first bootstrapping interface is triggered; switching the first bootstrapping interface to the second dialing interface in response to the operation instruction generated when the second option on the first bootstrapping interface is triggered; switching the current user interface to the first dialing interface if the call function is enabled; switching the current user interface to the first bootstrapping interface if the preset application is not enabled; switching the first bootstrapping interface to a third bootstrapping interface in response to the operation instruction generated when the first option on the first bootstrapping interface is triggered; and switching the third bootstrapping interface to the first dialing interface in response to an operation instruction generated when a third option on the third bootstrapping interface is triggered. Through the above technical solution, the user can be bootstrapped to enable the preset application when enabling of the call function depends on enabling of the preset application.

In a possible implementation, the preset application is a Hyper Terminal application, the third bootstrapping interface is used for bootstrapping a user to enable the Hyper Terminal application, and the third bootstrapping interface includes a privacy statement and a scrolling display region of the Hyper Terminal application, the scrolling display region including a Hyper Terminal function introduction interface, a super call function introduction interface, and a super call function enabling description interface that are scroll-displayed. Through the above technical solution, it is convenient for the user to understand functions of a Hyper Terminal.

In a possible implementation, the switching the third bootstrapping interface to the first dialing interface in response to an operation instruction generated when a third option on the third bootstrapping interface is triggered includes: switching the third bootstrapping interface to a function interface of the Hyper Terminal application in response to the operation instruction generated when the third option on the third bootstrapping interface is triggered; and switching the function interface of the Hyper Terminal application to the first dialing interface in response to an operation instruction generated when a back option on the function interface of the Hyper Terminal application is triggered. Through the above technical solution, it is convenient for the user to understand functions provided by the Hyper Terminal.

In a possible implementation, the method further includes: detecting, in response to the operation instruction generated when the phone application is enabled, whether a privacy statement of the preset application is accepted; detecting, if the privacy statement of the preset application is accepted, whether a user account is logged into; detecting, if the user account is logged into, whether the call function is enabled; switching the current user interface to the first dialing interface if the call function is enabled; switching the current user interface to the first bootstrapping interface if the call function is not enabled; switching the first bootstrapping interface to the first dialing interface in response to the operation instruction generated when the first option on the first bootstrapping interface is triggered; and switching the first bootstrapping interface to the second dialing interface in response to the operation instruction generated when the second option on the first bootstrapping interface is triggered. Through the above technical solution, the user can be bootstrapped to implement the super call function in a case where the privacy statement of the preset application is accepted by the user.

In a possible implementation, the method further includes: the method further includes: switching the current user interface to a fourth bootstrapping interface if the user account is not logged into; switching the fourth bootstrapping interface to an account login interface in response to an operation instruction generated when a fourth option on the fourth bootstrapping interface is triggered; switching the account login interface to the first dialing interface in response to an operation instruction generated by account login; and switching the fourth bootstrapping interface to the second dialing interface in response to an operation instruction generated when a fifth option on the fourth bootstrapping interface is triggered. Through the above technical solution, the user can be bootstrapped to log into an account when the user does not log into the account.

In a possible implementation, the method further includes: detecting, if the privacy statement of the preset application is not accepted, whether the user account is logged into; switching the current user interface to a fifth bootstrapping interface if the user account is logged into; switching the fifth bootstrapping interface to the first dialing interface in response to an operation instruction generated when a sixth option on the fifth bootstrapping interface is triggered; and switching the fifth bootstrapping interface to the second dialing interface in response to an operation instruction generated when a seventh option on the fifth bootstrapping interface is triggered. Through the above technical solution, the user can be bootstrapped to accept the privacy statement of the preset application when the privacy statement of the preset application is not accepted by the user.

In a possible implementation, the method further includes: switching the current user interface to the fifth bootstrapping interface if the user account is not logged into; switching the fifth bootstrapping interface to the account login interface in response to the operation instruction generated when the sixth option on the fifth bootstrapping interface is triggered; switching the account login interface to the first dialing interface in response to the operation instruction generated by account login; and switching the fifth bootstrapping interface to the second dialing interface in response to the operation instruction generated when the seventh option on the fifth bootstrapping interface is triggered. Through the above technical solution, the user can be bootstrapped to log into an account when receiving the privacy statement of the preset application.

In a possible implementation, both the fourth bootstrapping interface and the fifth bootstrapping interface include a scrolling display region and a privacy statement, where the scrolling display region is used for scroll-displaying a Hyper Terminal function introduction, a super call function introduction, and a super call function enabling description. Through the above technical solution, it is convenient for the user to understand functions and enabling conditions of the Hyper Terminal and the super call.

In a possible implementation, the method further includes: switching the current user interface to a preset application interface in response to an operation instruction generated when the preset application is enabled; detecting, in response to an operation instruction generated when a call option on the preset application interface is triggered, whether a call function is enabled; switching the preset application interface to a fourth dialing interface if the call function is enabled; switching the preset application interface to a fifth dialing interface if the call function is not enabled; and switching the fifth dialing interface to the fourth dialing interface in response to an operation instruction generated when an enable option on the fifth dialing interface is triggered. Through the above technical solution, the user can be bootstrapped, through a Hyper Terminal application interface, to enable a dialing interface of the super call.

In a possible implementation, the fourth dialing interface is an activated super call interface, and the fourth dialing interface includes a phone interface and a contacts interface, the phone interface including a call log region and a dialing region, contacts information in the call log region be triggerable to call contacts, the dialing region including a plurality of numeric keys and a triggerable dial key. Through the above technical solution, it is convenient for the user to implement the super call function on the dialing interface of the super call.

In a possible implementation, the fifth dialing interface is an inactivated super call interface, and the fifth dialing interface includes a phone interface and a contacts interface, the phone interface including a prompt region and a dialing region. The prompt region includes a function introduction and an enable option of a super call, the enable option being triggerable to switch the fifth dialing interface to the fourth dialing interface, and the dialing region includes a plurality of numeric keys and an untriggerable dial key. Through the above technical solution, the user can be bootstrapped to re-enable the super call function when the super call function is not enabled.

In a possible implementation, the method further includes: displaying a sixth bootstrapping interface in response to the operation instruction generated when the enable option on the fifth dialing interface is triggered; switching the fifth dialing interface to the fourth dialing interface in response to an operation instruction generated when a cancel option on the sixth bootstrapping interface is triggered; and creating a shortcut to the phone application in response to an operation instruction generated when an OK option on the sixth bootstrapping interface is triggered. Through the above technical solution, when the user re-enables the super call function, the user can be bootstrapped to add a shortcut to the phone application, so that it is convenient to quickly answer and make calls.

In a possible implementation, the switching the preset application interface to a fourth dialing interface if the call function is enabled includes: detecting, if the call function is enabled, whether an electronic device is in a MagicRing; switching the preset application interface to a sixth dialing interface if the electronic device is not in the MagicRing; detecting, if the electronic device is in the MagicRing, whether the MagicRing where the electronic device is located includes at least one terminal device with a communication card; switching the preset application interface to the fourth dialing interface if the MagicRing where the electronic device is located includes at least one terminal device with a communication card; and switching the preset application interface to the sixth dialing interface if the MagicRing where the electronic device is located does not include at least one terminal device with a communication card. Through the above technical solution, the user can be bootstrapped to confirm whether the electronic device is in the ring or whether the ring includes a terminal device with a communication card, which is convenient to realize the super call function.

In a possible implementation, the sixth dialing interface is an inactivated super call interface, the sixth dialing interface includes a phone interface and a contacts interface, the phone interface including a prompt region, a call log region, and a dialing region, the prompt region including prompt information used for prompting that the electronic device is not connected to a terminal device with a communication card, the dialing region including a plurality of numeric keys and a triggerable dial key, the call log region including a search box and a call log, the search box allowing a user to enter contacts information to search the call log, the call log including contacts information, the plurality of numeric keys and the triggerable dial key being displayed in the dialing region, and if the electronic device is not in the MagicRing or the MagicRing does not include a terminal device with a communication card, pop-up prompt information is displayed when the dial key is triggered, so as to reminder the user that there is no device available for dialing. Through the above technical solution, the user can be bootstrapped to connect a terminal device with a communication card.

In a possible implementation, the method further includes: detecting, when the first dialing interface of the phone application is in an enabled state, whether an account operation event occurs; and deleting a call log from the first dialing interface if the account operation event occurs. Through the above technical solution, leakage of privacy can be prevented when the account is changed.

According to a second aspect, this application provides an electronic device, including a memory and a processor, where the memory is configured to store program instructions; and the processor is configured to read and execute the program instructions stored in the memory, and the program instructions, when executed by the processor, cause the electronic device to perform the call service bootstrapping method above.

According to a third aspect, this application provides a computer storage medium, storing computer instructions, where the computer instructions, when run on an electronic device, cause the electronic device to perform the call service bootstrapping method above.

In addition, for the technical effects brought in the second aspect and the third aspect, refer to the related descriptions of the methods involved in the above method parts, and details are not described herein again.

According to the call service bootstrapping method, the electronic device, and the storage medium provided in the embodiments of this application, when the user uses an electronic device without a call function, the user can be bootstrapped, through an application and a user interface, to enable a call function, and the user can be bootstrapped to enable a call dialing interface, facilitating the user to answer and make calls by using the electronic device.

BRIEF DESCRIPTION OF DRAWINGS

FIG. 5A is a schematic diagram of a first bootstrapping interface according to an embodiment of this application;

FIG. 5B is a schematic diagram of a first dialing interface according to an embodiment of this application;

FIG. 13 is a flowchart of a call service bootstrapping method according to another embodiment of this application;

FIG. 14 is a schematic diagram of a third dialing interface according to an embodiment of this application;

FIG. 16B is a schematic diagram of a fourth dialing interface according to an embodiment of this application;

FIG. 16C is a schematic diagram of a fifth dialing interface according to an embodiment of this application;

FIG. 18 is a schematic diagram of a sixth dialing interface according to an embodiment of this application;

DESCRIPTION OF EMBODIMENTS

Figure 1A:
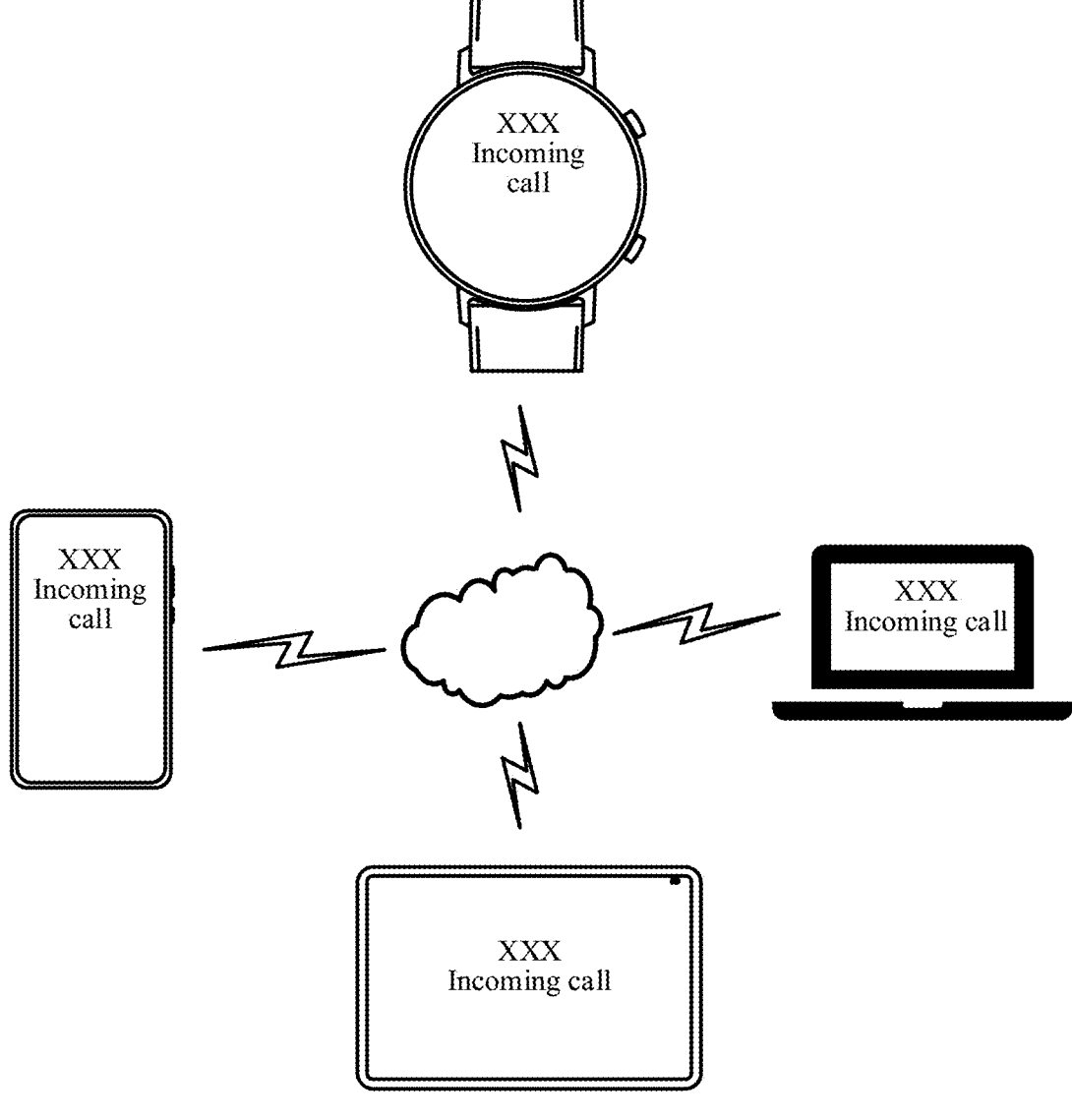
FIG. 1A is a schematic diagram of an application scenario of a super call according to an embodiment of this application.

For ease of understanding, exemplary descriptions of some concepts related to the embodiments of this application are provided for reference.

It should be noted that in the embodiments of this application, terms "first" and "second" are used merely for the purpose of description, and shall not be construed as indicating or implying relative importance or implying a quantity of indicated technical features. Therefore, a feature limited by "first" or "second" may explicitly or implicitly include one or more of the features. In the description of the embodiments of this application, the terms, such as "exemplarily" and "for example", are used to represent giving an example, an illustration or a description. Any embodiment or design scheme described by using "exemplarily" or "for example" in the embodiments of this application should not be explained as being more preferred or having more advantages than another embodiment or design scheme. In particular, the terms such as "exemplary" and "for example" as used herein are intended to present the related concept in a specific manner.

Unless otherwise defined, meanings of all technical and scientific terms used in this specification are the same as those usually understood by a person skilled in the art to which this application belongs. In this application, terms used in the specification of this application are merely intended to describe objectives of the specific embodiments, but are not intended to limit this application. It should be understood that, unless otherwise stated in this application, "/" means or. For example, A/B may represent A or B. In this application, "and/or" describes only an association relationship for describing associated objects and indicates that three relationships may exist. For example, A and/or B may represent: the following three cases: only A exists, both A and B exist, and only B exists. "At least one" means one or more. "A plurality of" means two or more. For example, at least one of a, b, and c may represent: a; b; c; a and b; a and c; b and c; and a, b, and c.

A user interface (user interface, UI) in the embodiments of this application is a medium interface for interaction and information exchange between an application or operating system and a user, and may implement conversion between an internal form of information and a form acceptable to the user. A user interface of the application is source code written in a specific computer language such as JAVA or an extensible markup language (extensible markup language, XML). The interface source code is parsed and rendered on an electronic device, and is finally presented as user-recognizable content, for example, a control such as an image, a text, or a button. A control (control) is a basic element of the user interface. Typical controls include a button (button), a widget (widget), a toolbar (toolbar), a menu bar (menu bar), a text box (text box), a scrollbar (scrollbar), an image (image), and a text (text). The attributes and content of the controls in the interface are defined by tags or nodes. For example, XML specifies the controls included in the interface through nodes such as <Textview>, <ImgView>, and <VideoView>. One node corresponds to one control or attribute in the interface, and the node is parsed and rendered, and is then presented as user-visible content. In addition, interfaces of many applications, such as hybrid applications (hybrid application), generally further include web pages. A web page, also referred to as a page, may be understood as a special control embedded in an application interface. The web page is source code written in a specific computer language, such as a hyper text markup language (hyper text markup language, HTML), cascading style sheets (cascading style sheets, CSS), or JAVA scripts (JavaScript, JS). The source code of the web page may be loaded and displayed as user-recognizable content by a browser or a web page display component with similar functions to the browser. Specific content included in the web page is also defined by tags or nodes in the source code of the web page. For example, HTML defines elements and attributes of the web page through <p>, <img>, <video>, and <canvas>.

A common representation of the user interface is a graphic user interface (graphic user interface, GUI), which is a graphically displayed user interface related to computer operations. The GUI may be an interface element such as an icon, a window; or a control displayed on a display screen of an electronic device.

The following embodiments and features in the embodiments may be mutually combined in a case where no conflict occurs.

To better understand the call service bootstrapping method provided in the embodiments of this application, an application scenario of the call service bootstrapping method in this application is described below first.

Refer to FIG. 1A which is a schematic diagram of an application scenario of a super call according to an embodiment of this application. A master device with a SIM (Subscriber Identity Module) card performs near-field communication with a plurality of auxiliary devices, and the auxiliary devices each may have a SIM card or no SIM card. When the master device receives an incoming call, the auxiliary device may also display an incoming call interface, and the user may answer the incoming call through the auxiliary device. For example, a mobile phone in FIG. 1A may be a master device with a SIM card, and the remaining devices (such as a tablet computer and a smart watch) are auxiliary devices without SIM cards.

Figure 1B:
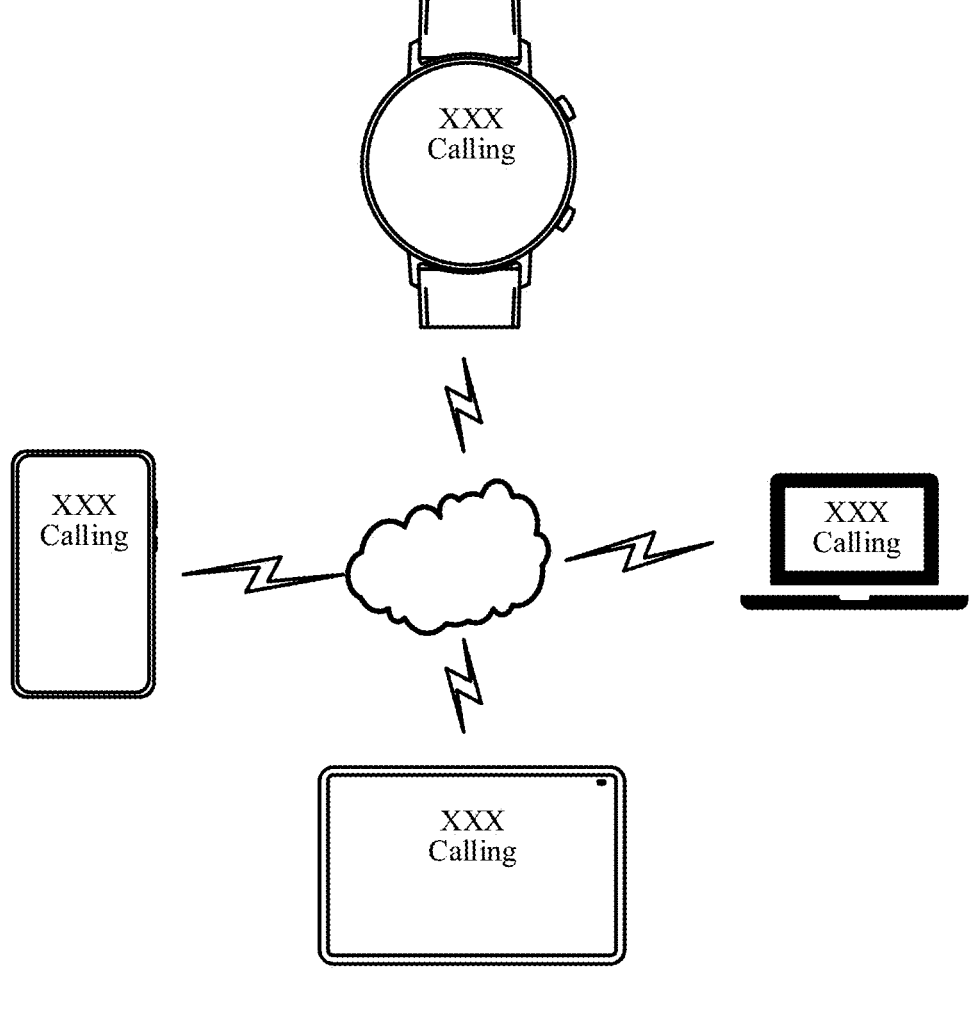
FIG. 1B is a schematic diagram of another application scenario of a super call according to an embodiment of this application.

Refer to FIG. 1B which is a schematic diagram of an application scenario of a super call according to another embodiment of this application. When a user implements a super call function through an auxiliary device, the user can dial on a user interface of the auxiliary device (such as a dialing interface of a super call), so as to use a phone function of the master device to call a designated contact.

For a terminal device without a SIM card but with a super call function, or a terminal device with a SIM card and a super call function, the implementation of the super call function depends on a setting operation of the user. However, habitual thinking of the user is that the terminal device does not have a call function, so the user does not understand or easily forget the setting operation of the super call, which makes it inconvenient for the user to perform the super call.

Figure 2:
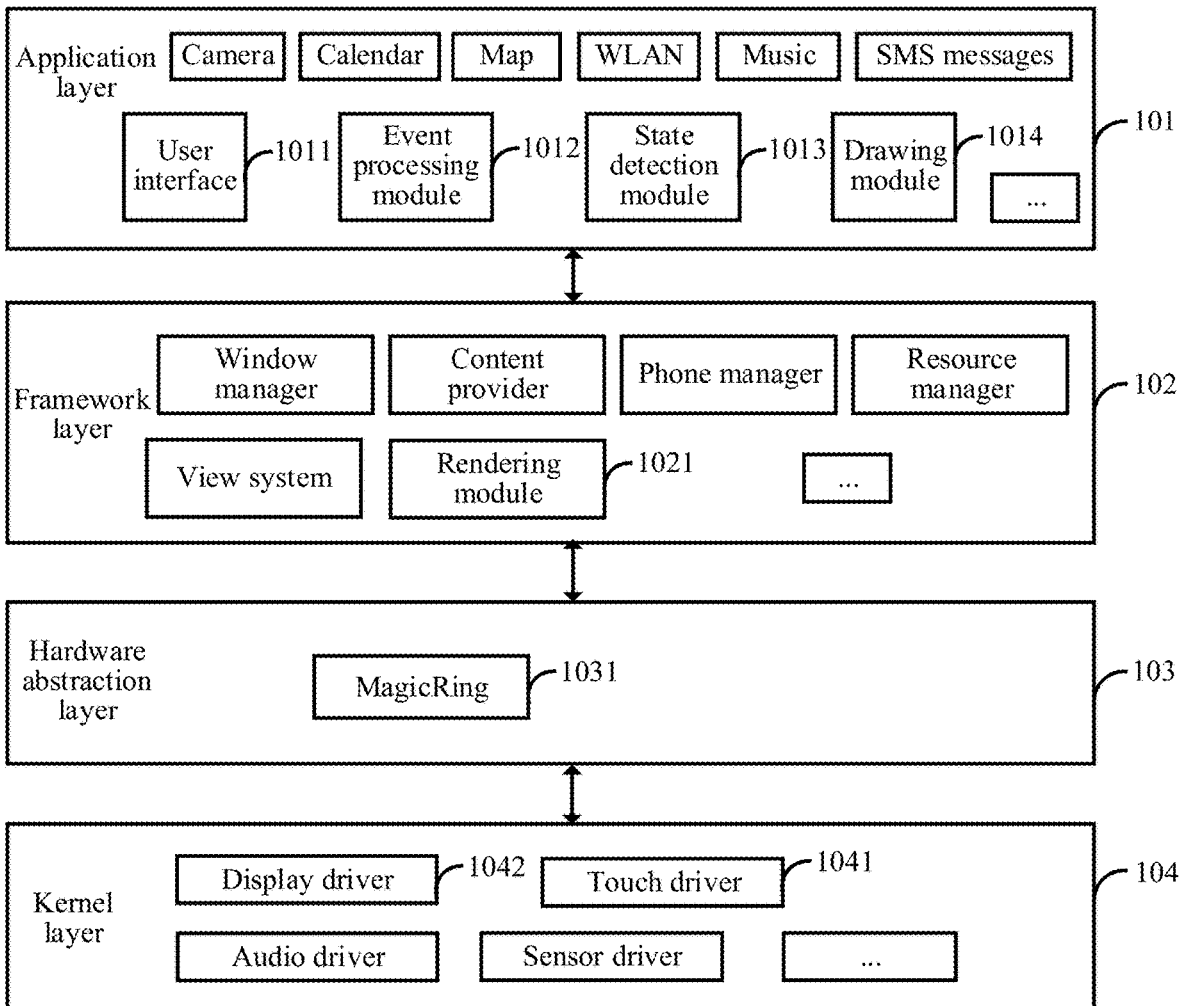
FIG. 2 is an architecture diagram of software of an electronic device according to an embodiment of this application.

Refer to FIG. 2 which is an architecture diagram of software of an electronic device according to an embodiment of this application. In a layered architecture, the software is divided into several layers, and each layer has a clear role and task. The layers communicate with each other through a software interface. For example, an Android system is divided into four layers, which are an application layer 101, an application framework layer 102, a hardware abstraction layer 103, and a kernel layer 104 from top to bottom.

The application layer may include a series of application packages. For example, the application packages may include applications such as Camera, Gallery, Calendar, Phone, Map, Navigation, WLAN, Bluetooth, Music, Videos, SMS messages, and device control services.

The framework layer provides an application programming interface (application programming interface, API) and a programming framework for an application at the application layer. The application framework layer includes some predefined functions. For example, the application framework layer may include a window manager, a content provider, a view system, a phone manager, a resource manager, a notification manager, and the like.

The window manager is configured to manage a window program. The window manager may acquire a size of a display screen, determine whether there is a status bar, perform screen locking, take a screenshot, and the like. The content provider is configured to store and acquire data and make the data accessible to an application. The data may include a video, an image, an audio, calls that are made and answered, a browsing history and a bookmark, a phonebook, and the like. The view system includes visual controls such as a control for displaying a text and a control for displaying an image. The view system may be configured to construct an application. A display interface may include one or more views. For example, a display interface including a short message notification icon may include a view for displaying a text and a view for displaying an image. The phone manager is configured to provide a communication function of the electronic device, for example, call status management (including connected, hang-up, and the like). The resource manager provides various resources for an application, such as a localized character string, an icon, an image, a layout file, and a video file. The notification manager enables an application to display notification information in the status bar that may be used to convey a message of a notification type, where the message may disappear automatically after a short stay without user interaction. For example, the notification manager is configured to provide a notification of download completion, a message notification, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted on a status bar, a prompt tone is made, the electronic device vibrates, an indicator light flashes, or the like.

The application layer and the application framework layer run in a virtual machine. The virtual machine executes java files at the application layer and the application framework layer as binary files. The virtual machine is configured to execute functions such as object lifecycle management, stack management, thread management, security and exception management, and garbage collection.

The hardware abstraction layer runs in a user space, encapsulates a kernel layer driver, and provides an invocation interface for an upper layer.

The kernel layer is a layer between hardware and software. The kernel layer includes at least a display driver, a camera driver, an audio driver, and a sensor driver.

The kernel layer is a core of an operating system of the electronic device, is the first layer of software expansion based on hardware, provides the most basic functions of the operating system, is a basis of the operating system, and is responsible for managing processes, memory, device drivers, files, and network systems of the system, which determines performance and stability of the system. For example, a kernel may determine when an application operates on certain hardware.

The kernel layer includes programs closely related to hardware, such as an interrupt handler and a device driver, further includes basic, public, and high-frequency modules, such as a clock management module and a process scheduling module, and also includes a key data structure. The kernel layer may be disposed in a processor or solidified in an internal memory.

In an embodiment of this application, the application layer 101 includes a user interface 1011, an event processing module 1012, a state detection module 1013, and a drawing module 1014. The framework layer 102 includes a rendering module 1021. The hardware abstraction layer 103 includes a MagicRing 1031. The kernel layer 104 includes a touch driver 1041 and a display driver 1042.

In an embodiment of this application, the event processing module 1012 is configured to process a touch event. The state detection module 1013 is configured to detect a setting state, a function state, and the like of the electronic device.

The drawing module 1014 is configured to generate a plurality of windows (view) of the user interface. The rendering module 1021 is configured to synthesize the plurality of windows to generate to-be-displayed user interface data. The MagicRing 1031 is configured to record information of at least one terminal device performing near-field communication with the electronic device. The touch driver 1041 is configured to detect a touch event. The display driver 1042 is configured to drive the display screen to display the user interface.

To solve the above problem that it is inconvenient to use an electronic device without a call function to perform a super call since the user does not understand a setting operation of the super call, an embodiment of this application provides a call service bootstrapping method.

Figure 3:
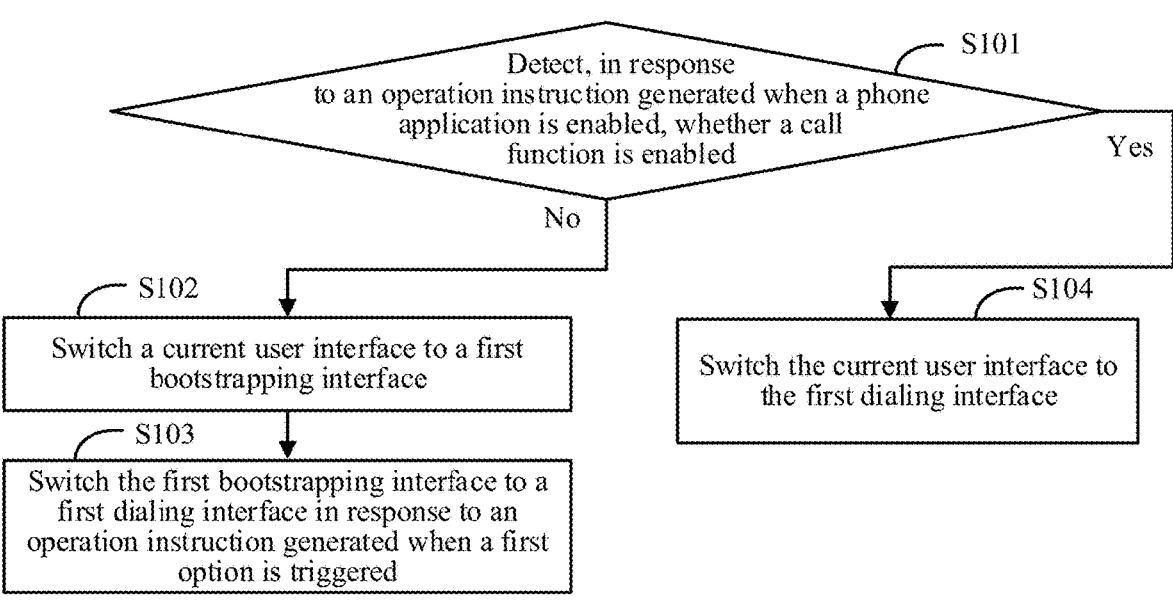
FIG. 3 is a flowchart of a call service bootstrapping method according to an embodiment of this application.

Refer to FIG. 3 which is a flowchart of a call service bootstrapping method according to an embodiment of this application. The method is applied to an electronic device. The electronic device may be a tablet computer or a smart watch. The call service bootstrapping method includes the following steps:

S101: Detect, in response to an operation instruction generated when a phone application is enabled, whether a call function is enabled. S102 is performed if the call function is not enabled. S104 is performed if the call function is enabled.

Figure 4A:
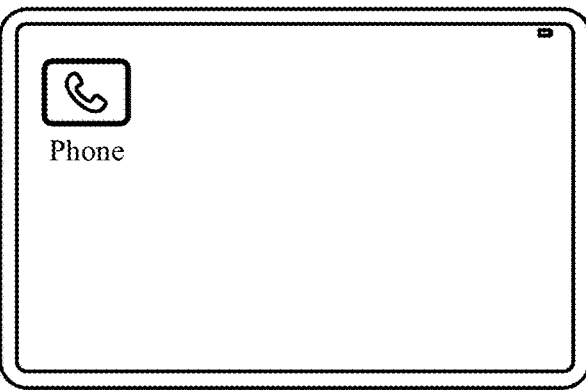
FIG. 4A is a schematic diagram of a desktop of an electronic device according to an embodiment of this application.

In an embodiment of this application, the call function is a super call function. Referring to FIG. 4A, a phone application is pre-installed on an electronic device. A desktop user interface of the electronic device includes an icon of the phone application. The phone application is a super call application. A cross-device, cross-platform, and cross-network call transfer function, that is, the super call function, can be realized through the phone application. "Cross-device" means crossing different terminal devices, such as a mobile phone, a tablet computer, a smart watch, a notebook computer, and a desktop computer. "Cross-platform" means crossing different operating systems, such as an Android system and a Windows system. "Cross-network" means crossing different communication networks, such as a mobile communication network and a Wi-Fi network.

In an embodiment of this application, the detecting, in response to an operation instruction generated when a phone application is enabled, whether a call function is enabled includes: transmitting, if the touch driver detects a touch event on the display screen, the touch event to the application layer, the touch event including a touch region, determining, by the event processing module, whether the touch region is within a display range corresponding to the icon of the phone application on the display screen, if the event processing module determines that the touch region is within the display range corresponding to the icon of the phone application on the display screen, determining the touch event as an operation of tapping the icon of the phone application with a finger, determining that the user performs an operation of enabling the phone application, and generating an operation instruction, and detecting, by the state detection module in response to the operation instruction, whether the call function of the electronic device is enabled.

Figure 4B:
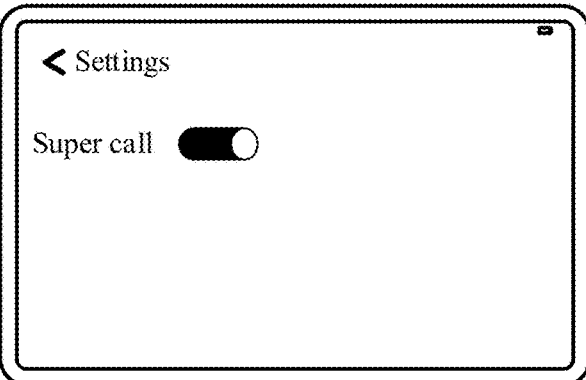
FIG. 4B is a schematic diagram of a setting interface of an electronic device according to an embodiment of this application.

Referring to FIG. 4B, in an embodiment of this application, whether the call function is enabled depends on whether a super call option on a setting interface or a drop-down menu interface of the electronic device is activated. The state detection module detects whether the super call option on the setting interface or the drop-down menu interface is activated, if the super call option on the setting interface or the drop-down menu interface is in an activated state (as shown in FIG. 4B), it is determined that the call function is enabled, and if the super call option on the setting interface or the drop-down menu interface is in an inactivated state, it is determined that the call function is not enabled.

S102: Switch a current user interface to a first bootstrapping interface.

In an embodiment of this application, the current user interface is a desktop. If the state detection module detects that the call function is not enabled, a drawing instruction is sent to the drawing module. The drawing module draws at least one window of the first bootstrapping interface in response to the drawing instruction, and transmits the drawn at least one window of the first bootstrapping interface to the rendering module. The rendering module synthesizes the at least one window to generate to-be-displayed data of the first bootstrapping interface. The rendering module transmits the to-be-displayed data of the first bootstrapping interface to the display driver. The display driver drives, based on the to-be-displayed data, the display screen to display the first bootstrapping interface.

Refer to FIG. 5A which is a schematic diagram of a first bootstrapping interface according to an embodiment of this application. The first bootstrapping interface is used for bootstrapping the user the super call function when the super call function is not enabled. The first bootstrapping interface includes, but is not limited to, a function introduction, an enabling description, a first option, and a second option of the super call. The function introduction may be "Allow calls to and from a mobile phone on this device", and the enabling description may be "Please make sure that this device and a nearby mobile phone have a same logged-in account and have Bluetooth and WiFi enabled". For example, the first option may be an enable option, which may be triggered by the user to enable the super call function, and the second option may be a cancel option, which may be triggered by the user to cancel bootstrapping of a super call function.

S103: Switch the first bootstrapping interface to a first dialing interface in response to an operation instruction generated when a first option on the first bootstrapping interface is triggered.

In an embodiment of this application, if the touch driver detects a touch event on the display screen, the touch event is transmitted to the application layer, where the touch event includes a touch region. The event processing module determines whether the touch region is within a display range corresponding to the first option. If the event processing module determines that the touch region is within the display range corresponding to the first option, the touch event is determined as an operation of tapping the first option with a finger, it is determined that the user performs an operation of enabling the super call function, and an operation instruction is generated. The drawing module draws at least one window of the first dialing interface in response to the operation instruction, and transmits the drawn at least one window of the first dialing interface to the rendering module. The rendering module synthesizes the at least one window to generate to-be-displayed data of the first dialing interface. The rendering module transmits the to-be-displayed data of the first dialing interface to the display driver. The display driver drives, based on the to-be-displayed data, the display screen to display the first dialing interface, so as to switch the first bootstrapping interface to the first dialing interface.

Refer to FIG. 5B which is a schematic diagram of a first dialing interface according to an embodiment of this application. In an embodiment of this application, the first dialing interface is an activated super call interface, and the user may answer and make calls through the first dialing interface. The first dialing interface includes a phone interface, a contacts interface, and a favorites interface. The phone interface is displayed by default. The phone interface includes a call log region and a dialing region. The call log region includes contacts information, which may be triggered to call contacts. The dialing region includes a plurality of numeric keys and a triggerable dial key. The plurality of numeric keys are provided for the user to enter a phone number. The dial key is provided for the user to perform an operation of dialing the phone number after entering the phone number. The favorites interface includes a call log added by the user. The user may trigger a phone option to control the first dialing interface to display the phone interface, trigger a contacts option to control the first dialing interface to display the contacts interface, or trigger a favorites option to control the first dialing interface to display the favorites interface.

S104: Switch the current user interface to the first dialing interface.

In an embodiment of this application, if the super call function is enabled, the first dialing interface is directly displayed based on the operation instruction generated when the phone application is enabled.

Figure 5C:
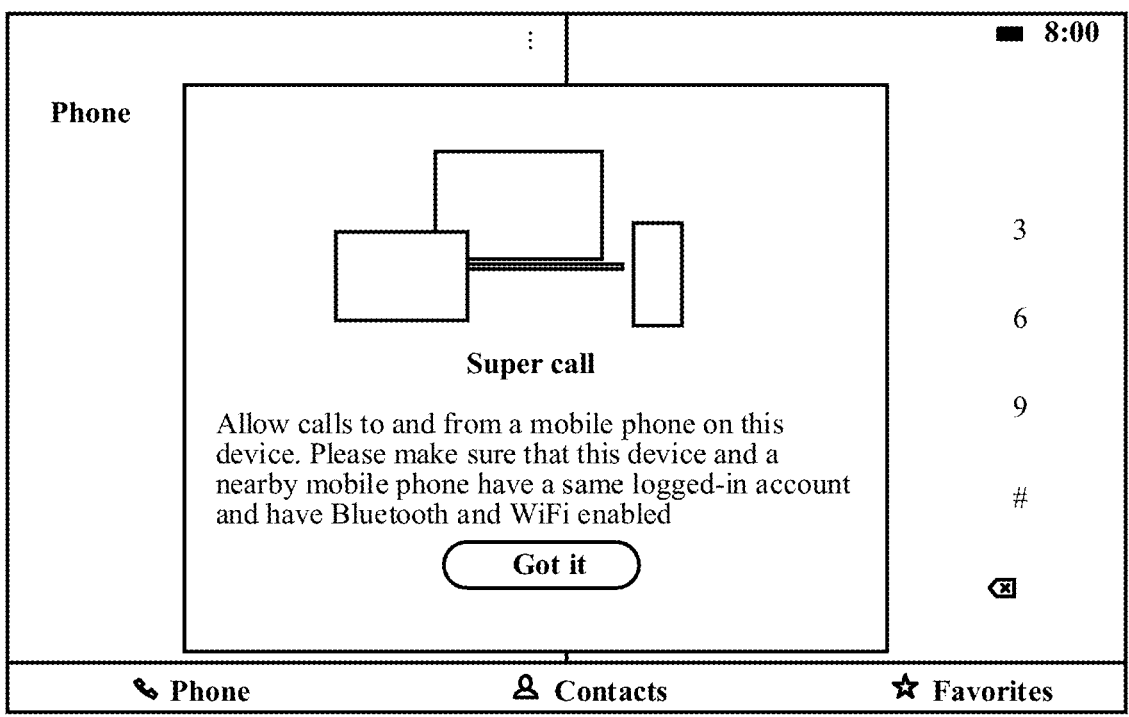
FIG. 5C is a schematic diagram of a second bootstrapping interface according to an embodiment of this application.

Refer to FIG. 5C which is a schematic diagram of a second bootstrapping interface according to an embodiment of this application. In another embodiment of this application, if the super call function is enabled, before the first dialing interface is displayed, a currently displayed user interface may be switched to the second bootstrapping interface, and then the second bootstrapping interface is switched to the first dialing interface. The second bootstrapping interface includes, but is not limited to, a function introduction and a function enabling description of a super call. The second bootstrapping interface may be configured to continuously display a preset time. Optionally, the preset time is 5 s. The first dialing interface is switched to and displayed at the end of the preset time. The second bootstrapping interface may alternatively display an option (e.g., a "Got it" option in FIG. 5C) for the user to manually close the second bootstrapping interface to switch to displaying the first dialing interface.

S105: Switch the first bootstrapping interface to a second dialing interface in response to an operation instruction generated when a second option on the first bootstrapping interface is triggered.

In an embodiment of this application, if the touch driver detects a touch event, the touch event is transmitted to the application layer, where the touch event includes a touch region. The event processing module determines whether the touch region is within a display range corresponding to the second option. If the event processing module determines that the touch region is within the display range corresponding to the second option, the touch event is determined as an operation of tapping the second option with a finger, it is determined that the user performs an operation of canceling bootstrapping of a super call function, and an operation instruction is generated. The drawing module draws at least one window of the second dialing interface in response to the operation instruction, and transmits the drawn at least one window to the rendering module. The rendering module synthesizes the at least one window to generate to-be-displayed data of the second dialing interface. The rendering module transmits the to-be-displayed data of the second dialing interface to the display driver. The display driver drives, based on the to-be-displayed data, the display screen to display the second dialing interface.

Figure 5D:
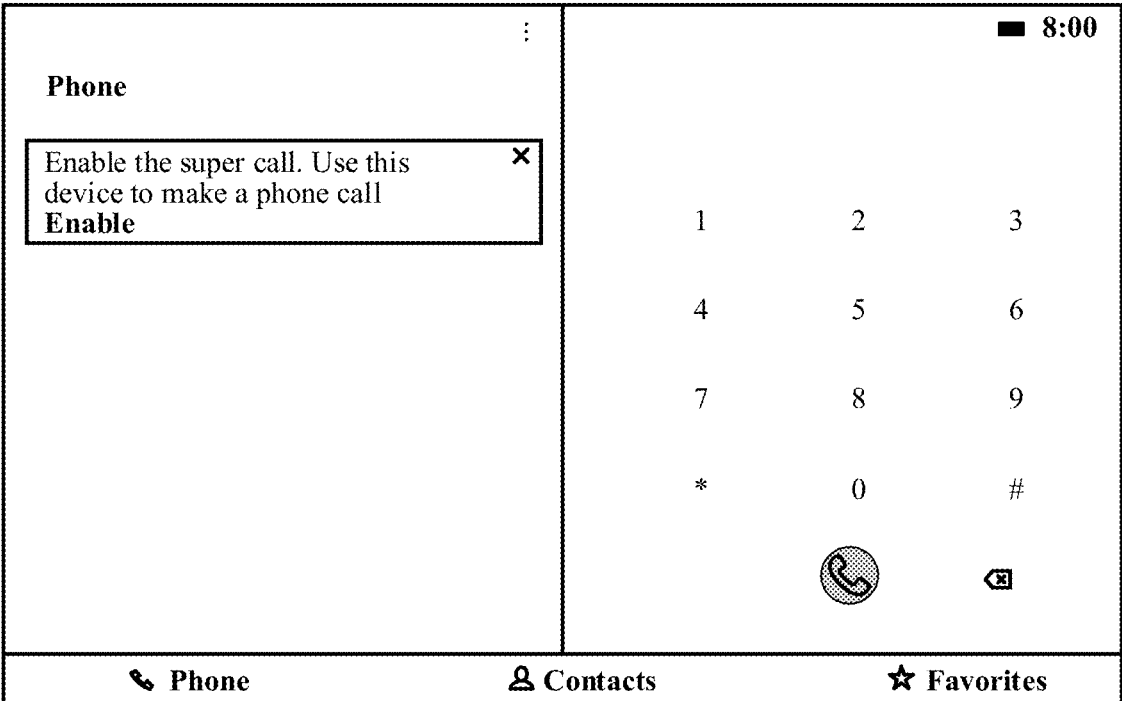
FIG. 5D is a schematic diagram of a second dialing interface according to an embodiment of this application.

Refer to FIG. 5D which is a schematic diagram of a second dialing interface according to an embodiment of this application. The second dialing interface is an inactivated super call interface. The user cannot answer and make calls through the second dialing interface. The second dialing interface includes a phone interface, a contacts interface, and a favorites interface. The phone interface is displayed by default. The phone interface includes a prompt region and a dialing region. The prompt region includes a function introduction and an enable option of a super call. The enable option may be triggered to perform S102 to S104, so as to display the first dialing interface. The dialing region includes a plurality of numeric keys and an untriggerable dial key. The user may trigger a phone option to control the first dialing interface to display the phone interface, trigger a contacts option to control the first dialing interface to display the contacts interface, or trigger a favorites option to control the first dialing interface to display the favorites interface.

Figures 6, 7:
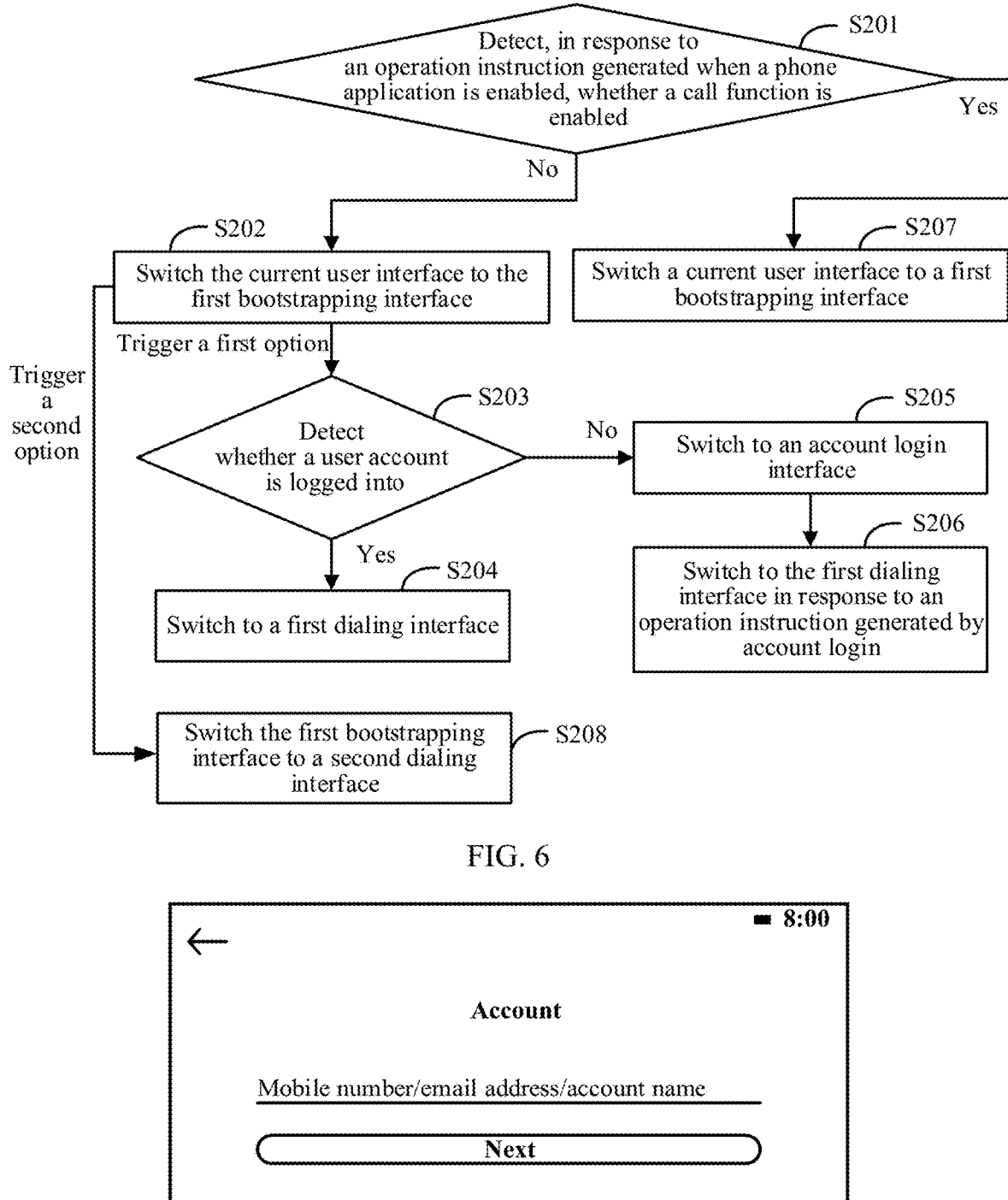
FIG. 6 is a flowchart of a call service bootstrapping method according to another embodiment of this application.
FIG. 7 is a schematic diagram of an account login interface according to an embodiment of this application.

Refer to FIG. 6 which is a flowchart of a call service bootstrapping method according to another embodiment of this application. The method is applied to an electronic device. The electronic device may be a tablet computer or a smart watch. The call service bootstrapping method includes the following steps:

S201: Detect, in response to an operation instruction generated when a phone application is enabled, whether a call function is enabled. S202 is performed if the call function is not enabled. S207 is performed if the call function is enabled. In the another embodiment of this application, the call function is a super call function.

S202: Switch a current user interface to a first bootstrapping interface.

S203: Detect, in response to an operation instruction generated when a first option on the first bootstrapping interface is triggered, whether a user account is logged into. S204 is performed if the user account is logged into. S205 is performed if the user account is not logged into.

In an embodiment of this application, if the touch driver detects a touch event on the display screen, the touch event is transmitted to the application layer, where the touch event includes a touch region. The event processing module determines whether the touch region is within a display range corresponding to the first option. If the event processing module determines that the touch region is within the display range corresponding to the first option, the touch event is determined as an operation of tapping the first option with a finger, it is determined that the user performs an operation of enabling the super call function, and an operation instruction is generated. The state detection module detects, in response to the operation instruction, whether the user account is logged into.

S204: Switch the first bootstrapping interface to a first dialing interface.

In an embodiment of this application, if the state detection module detects that the user account is logged into, the first dialing interface is directly displayed.

S205: Switch the first bootstrapping interface to an account login interface.

Refer to FIG. 7 which is a schematic diagram of an account login interface according to an embodiment of this application. In an embodiment of this application, if the state detection module detects that the user account is not logged into, a drawing instruction is generated. The drawing module draws at least one window of the account login interface in response to the drawing instruction, and transmits the drawn at least one window of the account login interface to the rendering module. The rendering module synthesizes the at least one window to generate to-be-displayed data of the account login interface. The rendering module transmits the to-be-displayed data of the account login interface to the display driver. The display driver drives, based on the to-be-displayed data, the display screen to display the account login interface, so as to switch the first bootstrapping interface to the account login interface.

In an embodiment of this application, the account login interface includes an input box and a login option. The input box includes an account input box. The login option is a "Next" option (as shown in FIG. 7).

> S206: Switch the account login interface to the first dialing interface in response to an operation instruction generated by account login.

In an embodiment of this application, the account login interface is switched to the first dialing interface when the user enters login information into the input box and triggers the login option.

In an embodiment of this application, if the touch driver detects a touch event on the display screen, the touch event is transmitted to the application layer, where the touch event includes a touch region. The event processing module determines whether the touch region is within a display range corresponding to the login option on the account login interface. If the event processing module determines that the touch region is within the display range corresponding to the login option on the account login interface, the touch event is determined as an operation of tapping the login option with a finger, it is determined that the user performs an account login operation, and a drawing instruction is sent to the drawing module. The drawing module draws at least one window of the first dialing interface in response to the drawing instruction, and transmits the drawn at least one window of the first dialing interface to the rendering module. The rendering module synthesizes the at least one window to generate to-be-displayed data of the first dialing interface. The rendering module transmits the to-be-displayed data of the first dialing interface to the display driver. The display driver drives, based on the to-be-displayed data, the display screen to display the first dialing interface, so as to switch the account login interface to the first dialing interface.

> S207: Switch the current user interface to the first dialing interface.

In an embodiment of this application, if the super call function is enabled, the first dialing interface is directly displayed based on an operation instruction generated when the phone application is enabled.

> S208: Switch the first bootstrapping interface to a second dialing interface in response to an operation instruction generated when a second option on the first bootstrapping interface is triggered.

Figure 8:
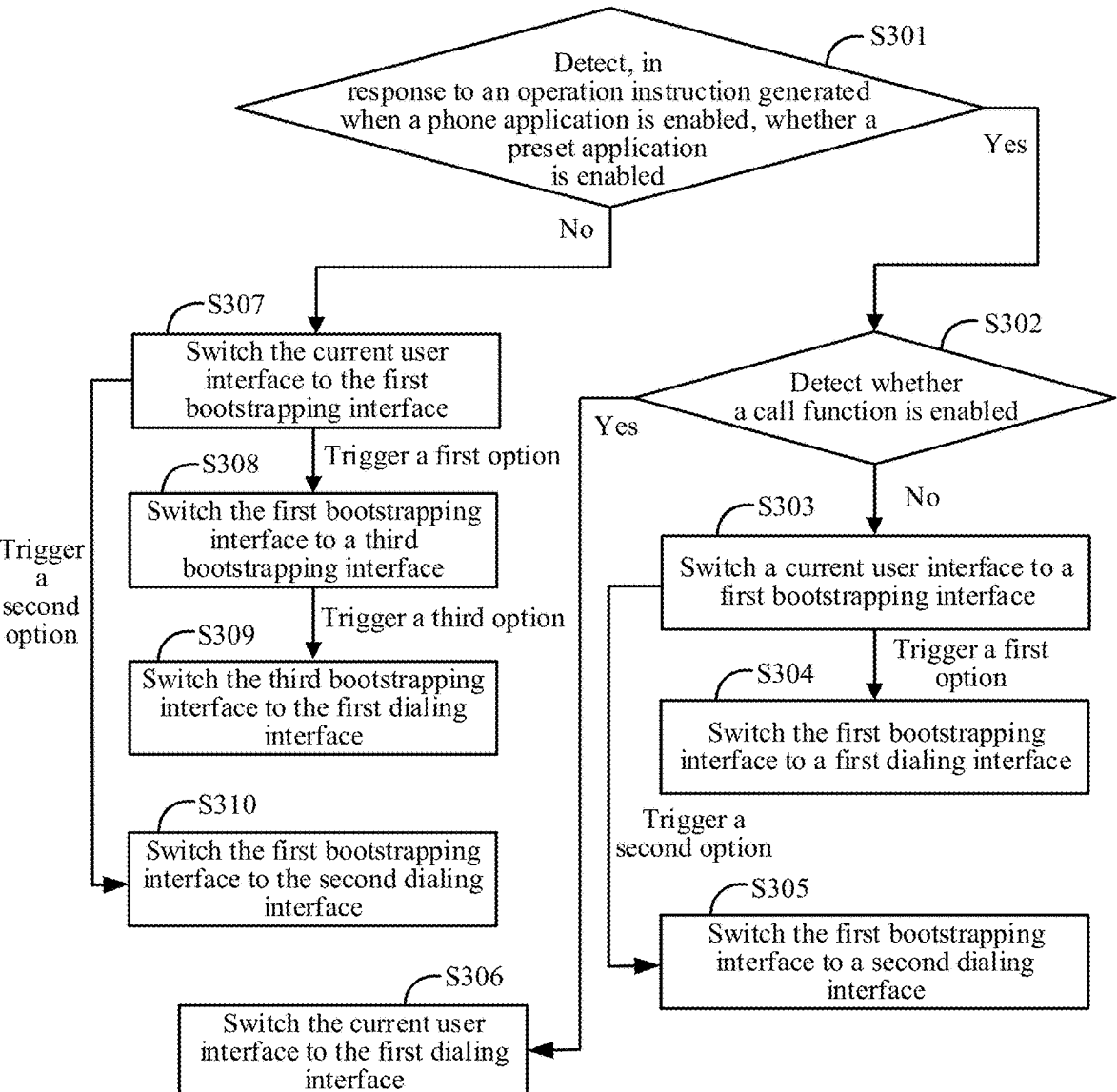
FIG. 8 is a flowchart of a call service bootstrapping method according to another embodiment of this application.

Refer to FIG. 8 which is a flowchart of a call service bootstrapping method according to another embodiment of this application. The method is applied to an electronic device. The electronic device may be a tablet computer or a smart watch. The call service bootstrapping method includes the following steps:

> S301: Detect, in response to an operation instruction generated when a phone application is enabled, whether a preset application is enabled. S302 is performed if the preset terminal application is enabled. S307 is performed if the preset application is not enabled.

In the another embodiment of this application, the preset application is a Hyper Terminal application. The Hyper Terminal application may realize multi-terminal interconnection and collaborative services, which, for example, may automatically form a Hyper Terminal with other terminals that are in a same network and having a same logged-in account, so that applications of the other terminals are used on a current electronic device, a phone function of a mobile phone is used on the current electronic device to realize a super call, notifications of the other terminals are synchronized to the current electronic device, the current electronic device shares an input device with a nearby computer, storage data of the other terminals is assessed on the current electronic device, and so on.

In the another embodiment of this application, if the touch driver detects a touch event on the display screen, the touch event is transmitted to the application layer, where the touch event includes a touch region. The event processing module determines whether the touch region is within a display range corresponding to the icon of the phone application on the display screen. If the event processing module determines that the touch region is within the display range corresponding to the icon of the phone application on the display screen, the touch event is determined as an operation of tapping the icon of the phone application with a finger, it is determined that the user performs an operation of enabling the phone application, and an operation instruction is generated. The state detection module detects, in response to the operation instruction, whether the preset application is enabled.

> S302: Detect whether a call function is enabled. S303 is performed if the call function is not enabled. S306 is performed if the call function is enabled.

In the another embodiment of this application, the call function is a super call function. The state detection module, if determining that the preset application is enabled, detects whether the call function is enabled.

> S303: Switch a current user interface to a first bootstrapping interface.
> S304: Switch the first bootstrapping interface to a first dialing interface in response to an operation instruction generated when a first option on the first bootstrapping interface is triggered.
> S305: Switch the first bootstrapping interface to a second dialing interface in response to an operation instruction generated when a second option on the first bootstrapping interface is triggered.
> S306: Switch the current user interface to the first dialing interface.
> S307: Switch the current user interface to the first bootstrapping interface.

In the another embodiment of this application, after the phone application is enabled, an enabling process of the preset application is performed if the preset application is not enabled.

> S308: Switch the first bootstrapping interface to a third bootstrapping interface in response to the operation instruction generated when the first option on the first bootstrapping interface is triggered.

In the another embodiment of this application, if the touch driver detects a touch event on the display screen, the touch event is transmitted to the application layer, where the touch event includes a touch region. The event processing module determines whether the touch region is within a display range corresponding to the first option. If the event processing module determines that the touch region is within the display range corresponding to the first option, the touch event is determined as an operation of tapping the first option with a finger, it is determined that the user performs an operation of enabling the super call function, and an operation instruction is generated. The drawing module draws at least one window of the third bootstrapping interface in response to the operation instruction, and transmits the drawn at least one window of the third bootstrapping interface to the rendering module. The rendering module synthesizes the at least one window to generate to-be-displayed data of the third bootstrapping interface. The rendering module transmits the to-be-displayed data of the third bootstrapping interface to the display driver. The display driver drives, based on the to-be-displayed data, the display screen to display the third bootstrapping interface, so as to switch the first bootstrapping interface to the third bootstrapping interface.

Figure 9A:
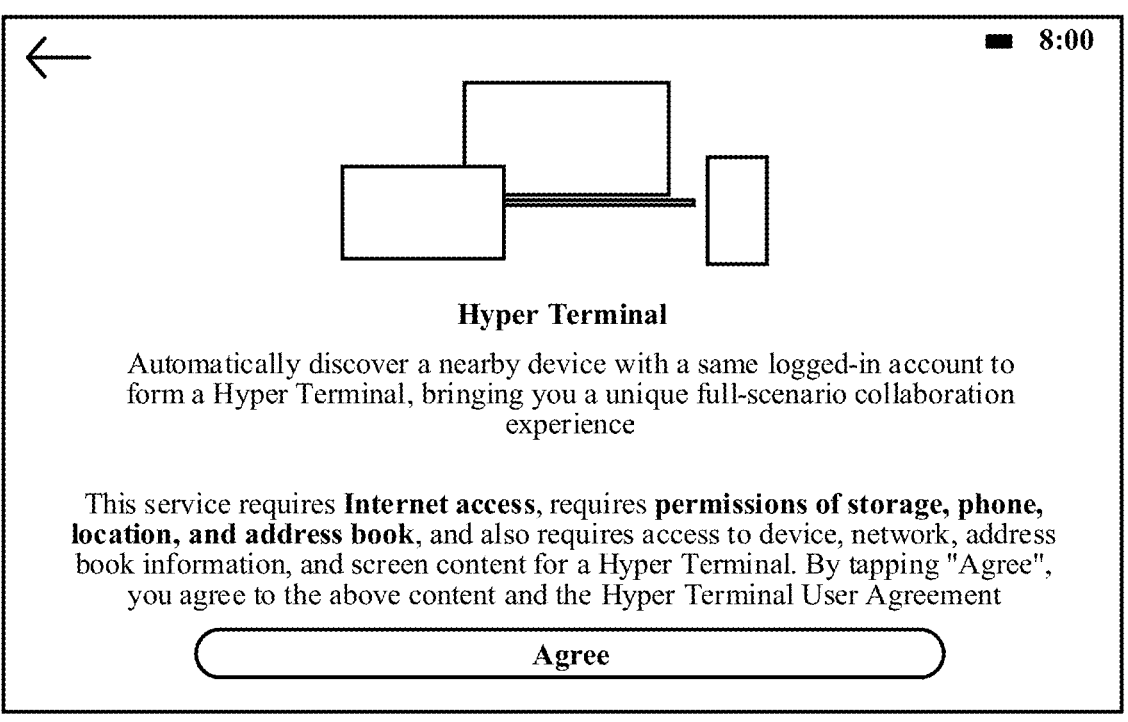
FIG. 9A is a schematic diagram of a third bootstrapping interface according to an embodiment of this application.

Refer to FIG. 9A which is a schematic diagram of a third bootstrapping interface according to an embodiment of this application. In the another embodiment of this application, the call function is available depending on enabling of the preset application. Therefore, the preset application needs to be first enabled when the present application is not enabled. The third bootstrapping interface is used for bootstrapping the user to enable the preset application. The third bootstrapping interface includes a privacy statement, a scrolling display region, and a third option of the preset application. The privacy statement may be "This service requires Internet access, requires permissions of storage, phone, location, and address book, and also requires access to device, network, address book information, and screen content for a Hyper Terminal. By tapping "Agree", you agree to the above content and the Hyper Terminal User Agreement", and the third option may be an agree option. The scrolling display region includes a Hyper Terminal function introduction interface, a super call function introduction interface, and two super call function enabling description interfaces that can be scroll-displayed. In the above four interfaces, each interface is continuously displayed for a preset time, and automatically switches to another interface after the preset time, so as to realize scrolling display. The above four interface may alternatively realize scrolling display in response to a swiping operation of the user on the interfaces, which, for example, are sequentially scroll-displayed in response to a left swiping operation of the user, and are reversely scroll-displayed in response to a right swiping operation of the user. A Hyper Terminal function introduction "Automatically discover a nearby device with a same logged-in account to form a Hyper Terminal, bringing you a unique full-scenario collaboration experience" is displayed on the Hyper Terminal function introduction interface. A super call function introduction "Allow calls to and from a mobile phone on this device" is displayed on the super call function introduction interface. A super call function enabling description "This device and a nearby mobile phone have a same logged-in account" is displayed on the first super call function enabling description interface. A super call function enabling description "A mobile phone and this device are in a same local area network" is displayed on the second super call function enabling description interface.

S309: Switch the third bootstrapping interface to the first dialing interface in response to an operation instruction generated when a third option on the third bootstrapping interface is triggered.

In the another embodiment of this application, if the third option on the third bootstrapping interface is triggered, the operation instruction is generated, and the first dialing interface is displayed in response to the operation instruction.

Figure 9B:
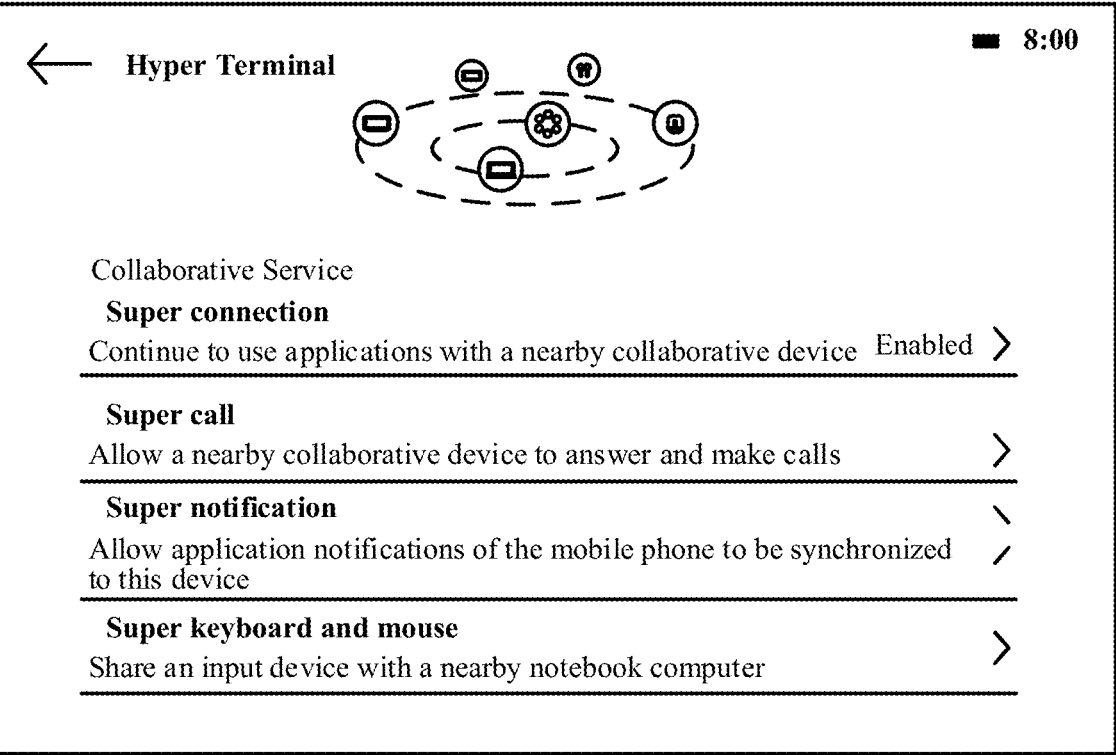
FIG. 9B is a schematic diagram of a function state interface of a Hyper Terminal according to an embodiment of this application.

Refer to FIG. 9B which is a schematic diagram of a function interface of a Hyper Terminal application according to an embodiment of this application. In the another embodiment of this application, if the third option is triggered, the operation instruction is generated, and the third bootstrapping interface is switched to the function interface of the Hyper Terminal application in response to the operation instruction. The function interface of the Hyper Terminal includes a back option. If the back option is triggered, the function interface of the Hyper Terminal application is switched to the first dialing interface. The back option is an arrow in FIG. 9B.

S310: Switch the first bootstrapping interface to the second dialing interface in response to an operation instruction generated when the second option on the first bootstrapping interface is triggered.

In another embodiment of this application, if the present application is not enabled, the current user interface may be switched to the third bootstrapping interface, and the third bootstrapping interface is switched to the first dialing interface in response to an operation instruction generated when a third option on the third bootstrapping interface is triggered.

Figure 10:
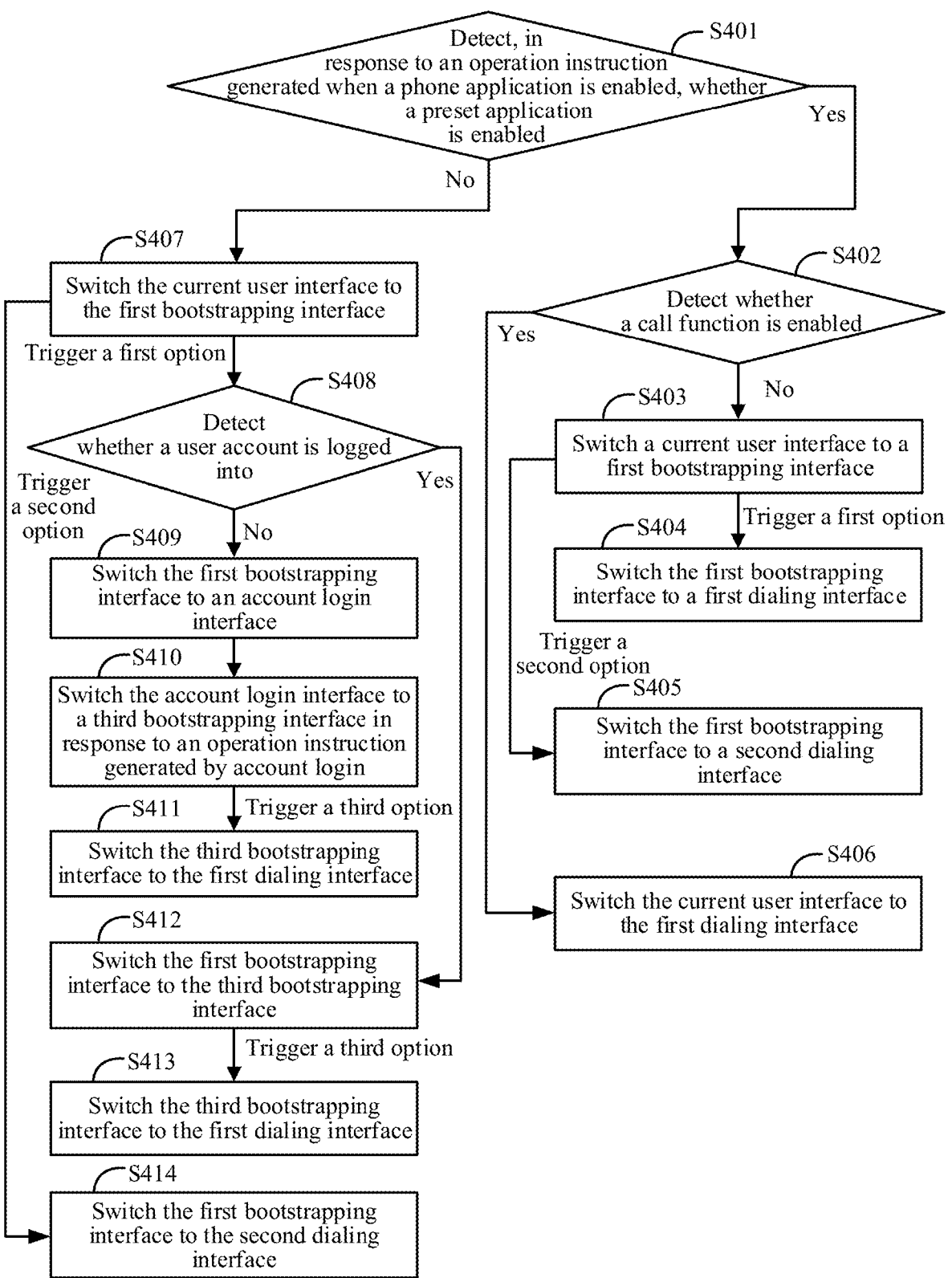
FIG. 10 is a flowchart of a call service bootstrapping method according to another embodiment of this application.

Refer to FIG. 10 which is a flowchart of a call service bootstrapping method according to another embodiment of this application. The method is applied to an electronic device. The electronic device may be a tablet computer or a smart watch. The call service bootstrapping method includes the following steps:

S401: Detect, in response to an operation instruction generated when a phone application is enabled, whether a preset application is enabled. S402 is performed if the preset application is enabled. S407 is performed if the preset application is not enabled. In the another embodiment of this application, the preset application is a Hyper Terminal application.

S402: Detect whether a call function is enabled. S403 is performed if the call function is not enabled. S406 is performed if the call function is enabled. In the another embodiment of this application, the call function is a super call function.

S403: Switch a current interface to a first bootstrapping interface.

S404: Switch the first bootstrapping interface to a first dialing interface in response to an operation instruction generated when a first option on the first bootstrapping interface is triggered.

S405: Switch the first bootstrapping interface to a second dialing interface in response to an operation instruction generated when a second option on the first bootstrapping interface is triggered.

S406: Switch the current interface to the first dialing interface.

S407: Switch the current interface to the first bootstrapping interface.

S408: Detect, in response to the operation instruction generated when the first option on the first bootstrapping interface is triggered, whether a user account is logged into. S412 is performed if the user account is logged into. S409 is performed if the user account is not logged into.

S409: Switch the first bootstrapping interface to an account login interface.

S410: Switch the account login interface to a third bootstrapping interface in response to an operation instruction generated by account login.

S411: Switch the third bootstrapping interface to the first dialing interface in response to an operation instruction generated when a third option on the third bootstrapping interface is triggered.

S412: Switch the first bootstrapping interface to the third bootstrapping interface.

S413: Switch the third bootstrapping interface to the first dialing interface in response to the operation instruction generated when the third option on the third bootstrapping interface is triggered.

S414: Switch the first bootstrapping interface to the second dialing interface in response to the operation instruction generated when the second option on the first bootstrapping interface is triggered.

In another embodiment of this application, if the present application is not enabled, the current user interface may be switched to the third bootstrapping interface. In response to the operation instruction generated when the third option on the third bootstrapping interface is triggered, it is detected whether a user account is logged into. If the user account is logged into, the third bootstrapping interface is switched to the first dialing interface. If the user account is not logged into, the third bootstrapping interface is switched to the account login interface. The account login interface is switched to the first dialing interface in response to the operation instruction generated by account login.

Figure 11A:
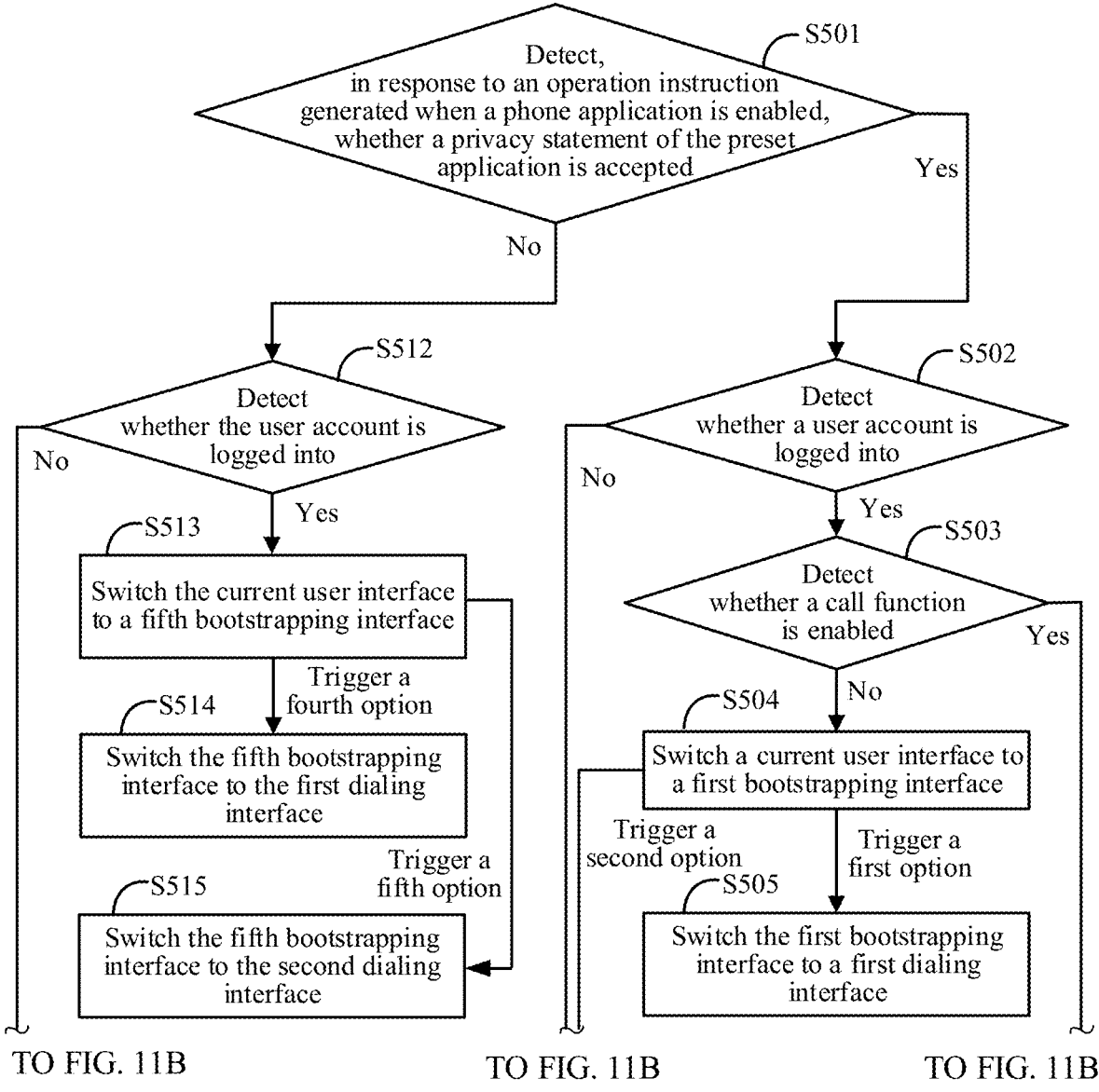
FIG. 11A and FIG. 11B are a flowchart of a call service bootstrapping method according to another embodiment of this application.
Figure 11B:
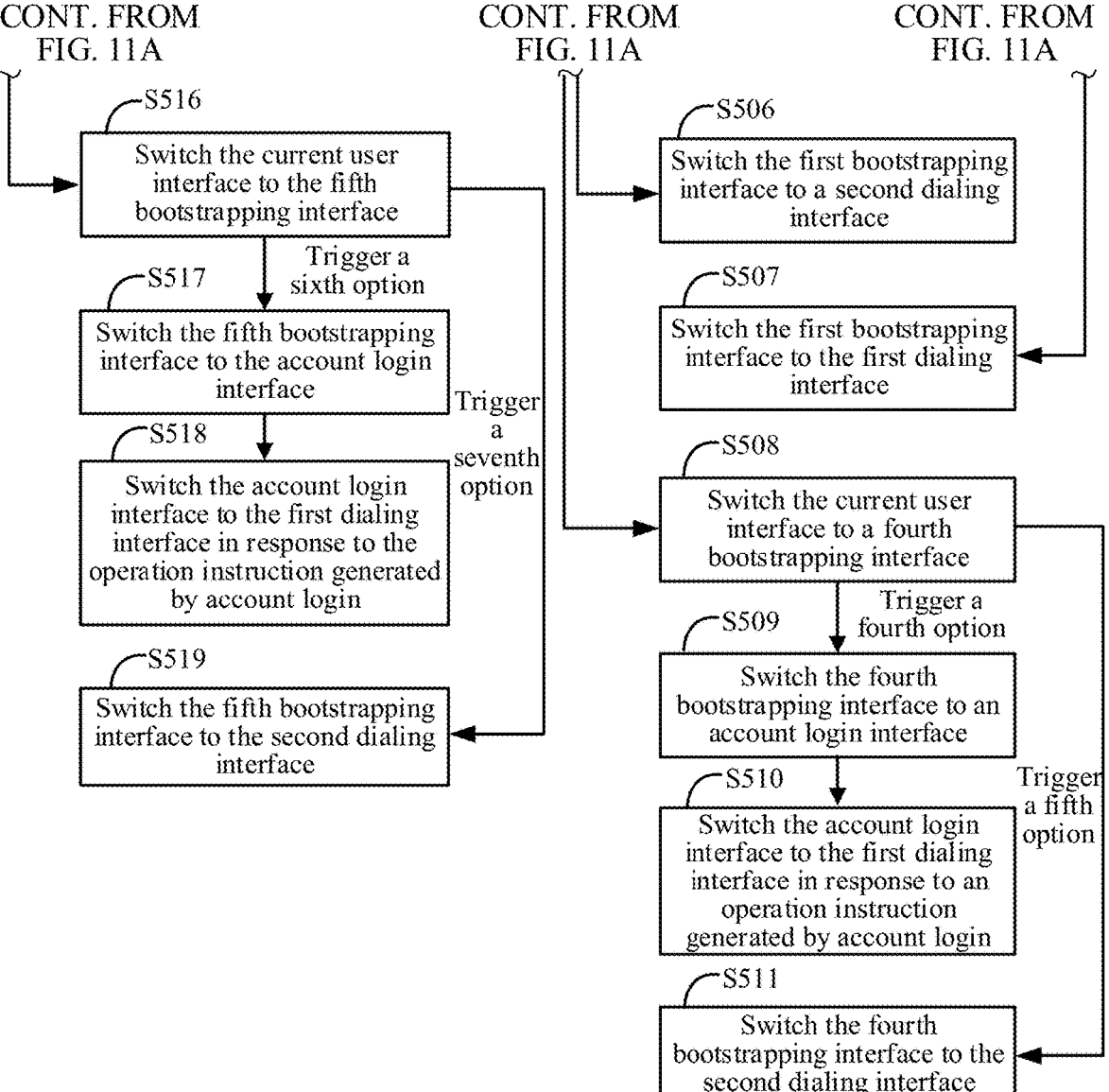

Refer to FIG. 11A and FIG. 11B which are a flowchart of a call service bootstrapping method according to another embodiment of this application. The method is applied to an electronic device. The electronic device may be a tablet computer or a smart watch. The call service bootstrapping method includes the following steps:

S501. Detect, in response to an operation instruction generated when a phone application is enabled, whether a privacy statement of the preset application is accepted. S512 is performed if the privacy statement of the preset application is not accepted. S502 is performed if the privacy statement of the preset application is accepted. In the another embodiment of this application, the preset application is a Hyper Terminal application.

In an embodiment of this application, if the touch driver detects a touch event, the touch event is transmitted to the application layer. If the event processing module determines that the touch event is determined as an operation of tapping the icon of the phone application with a finger, it is determined that the user performs an operation of enabling the phone application, and an operation instruction is generated. The state detection module detects, in response to the operation instruction, whether the privacy statement of the preset application is accepted. In the another embodiment of this application, the call function is a super call function.

S502: Detect whether a user account is logged into. S503 is performed if the user account is logged into. S508 is performed if the user account is not logged into.

S503: Detect whether a call function is enabled. S507 is performed if the call function is enabled. S504 is performed if the call function is not enabled.

S504: Switch a current user interface to a first bootstrapping interface.

S505: Switch the first bootstrapping interface to a first dialing interface in response to an operation instruction generated when a first option on the first bootstrapping interface is triggered.

S506: Switch the first bootstrapping interface to a second dialing interface in response to an operation instruction generated when a second option on the first bootstrapping interface is triggered.

S507: Switch the current user interface to the first dialing interface.

S508: Switch the current user interface to a fourth bootstrapping interface.

Figure 12A:
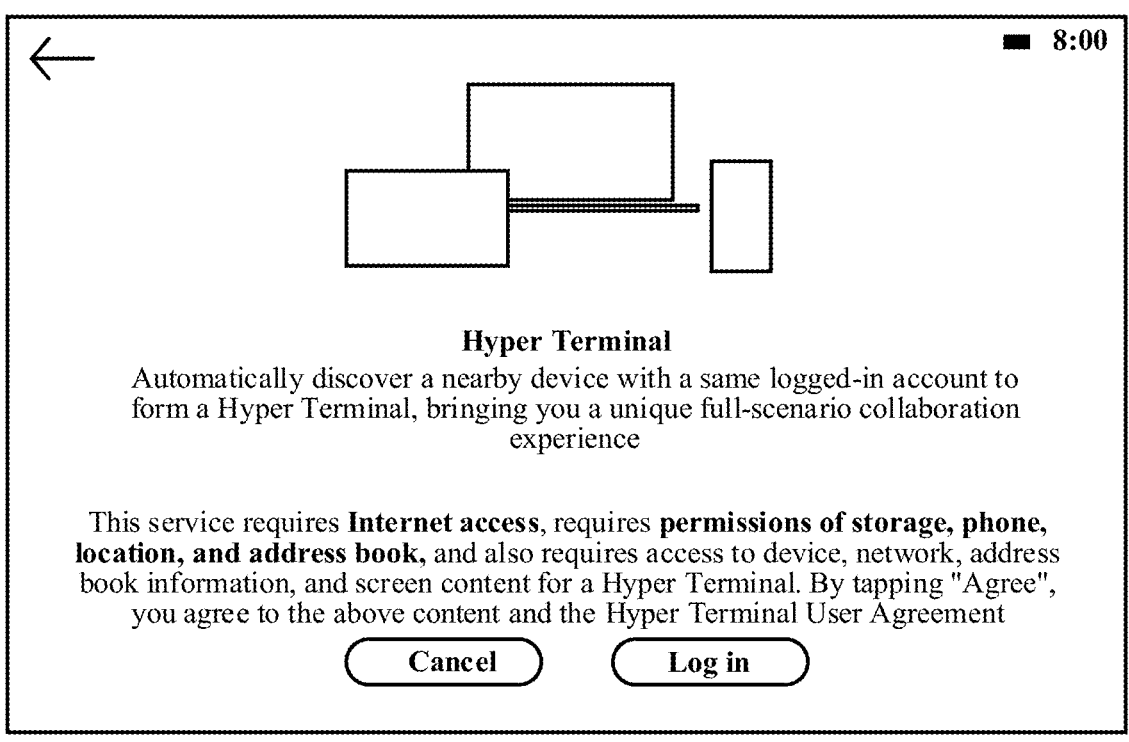
FIG. 12A is a schematic diagram of a fourth bootstrapping interface according to an embodiment of this application.

Refer to FIG. 12A which is a schematic diagram of a fourth bootstrapping interface according to an embodiment of this application. In an embodiment of this application, if the state detection module determines that the privacy statement of the preset application is not accepted and the user account is not logged into, a drawing instruction is generated. The drawing module draws at least one window of the fourth bootstrapping interface in response to the drawing instruction, and transmits the drawn at least one window of the fourth bootstrapping interface to the rendering module. The rendering module synthesizes the at least one window to generate to-be-displayed data of the fourth bootstrapping interface. The rendering module transmits the to-be-displayed data of the fourth bootstrapping interface to the display driver. The display driver drives, based on the to-be-displayed data, the display screen to display the fourth bootstrapping interface, so as to switch the current user interface to the fourth bootstrapping interface.

In an embodiment of this application, the fourth bootstrapping interface includes a scrolling display region, a privacy statement, a fourth option, and a fifth option. A Hyper Terminal function introduction, a super call function introduction, and a super call function enabling description are scroll-displayed in the scrolling display region. The fourth option is a login option, and the fifth option is a cancel option.

S509: Switch the fourth bootstrapping interface to an account login interface in response to an operation instruction generated when the fourth option on the fourth bootstrapping interface is triggered.

S510: Switch the account login interface to the first dialing interface in response to an operation instruction generated by account login.

S511: Switch the fourth bootstrapping interface to the second dialing interface in response to an operation instruction generated when the fifth option on the fourth bootstrapping interface is triggered.

S512: Detect whether a user account is logged into. S513 is performed if the user account is logged into. S516 is performed if the user account is not logged into.

S513: Switch the current user interface to a fifth bootstrapping interface.

Figure 12B:
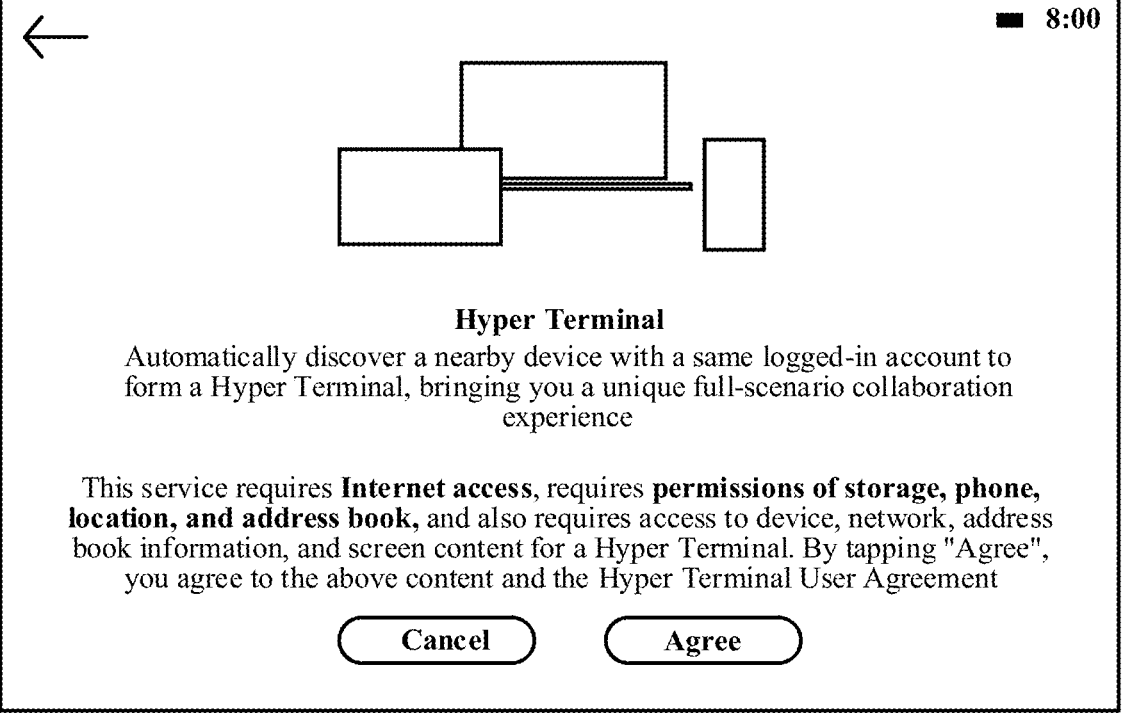
FIG. 12B is a schematic diagram of a fifth bootstrapping interface according to an embodiment of this application.

Refer to FIG. 12B which is a schematic diagram of a fifth bootstrapping interface according to an embodiment of this application. In an embodiment of this application, if the state detection module determines that the privacy statement of the preset application is not accepted and the user account is not logged into, a drawing instruction is generated. The drawing module draws at least one window of the fifth bootstrapping interface in response to the drawing instruction, and transmits the drawn at least one window of the fifth bootstrapping interface to the rendering module. The rendering module synthesizes the at least one window to generate to-be-displayed data of the fifth bootstrapping interface. The rendering module transmits the to-be-displayed data of the fifth bootstrapping interface to the display driver. The display driver drives, based on the to-be-displayed data, the display screen to display the fifth bootstrapping interface, so as to switch the current user interface to the fifth bootstrapping interface.

In an embodiment of this application, the fifth bootstrapping interface includes a scrolling display region, a privacy statement, a sixth option, and a seventh option. A Hyper Terminal function introduction, a super call function introduction, and a super call function enabling description are scroll-displayed in the scrolling display region. The sixth option is an agree option, and the seventh option is a cancel option.

S514: Switch the fifth bootstrapping interface to the first dialing interface in response to an operation instruction generated when the sixth option on the fifth bootstrapping interface is triggered.

S515: Switch the fifth bootstrapping interface to the second dialing interface in response to an operation instruction generated when the seventh option on the fifth bootstrapping interface is triggered.

S516: Switch the current user interface to the fifth bootstrapping interface.

S517: Switch the fifth bootstrapping interface to the account login interface in response to the operation instruction generated when the sixth option on the fifth bootstrapping interface is triggered.

S518: Switch the account login interface to the first dialing interface in response to the operation instruction generated by account login.

S519: Switch the fifth bootstrapping interface to the second dialing interface in response to the operation instruction generated when the seventh option on the fifth bootstrapping interface is triggered.

In another embodiment of this application, in S514, in response to the operation instruction generated when the sixth option on the fifth bootstrapping interface is triggered, it is determined whether the electronic device is in a MagicRing and whether the MagicRing includes at least one terminal device with a communication card. If the electronic device is in the MagicRing and the MagicRing includes at least one terminal device with a communication card, the fifth bootstrapping interface is switched to the first dialing interface. If the electronic device is not in the MagicRing and the MagicRing does not include at least one terminal device with a communication card, the fifth bootstrapping interface is switched to the second dialing interface. Optionally, the communication card may be a SIM card or an eSIM card. The terminal device with the communication card may be a mobile phone or a smart watch.

It should be noted that the flowcharts of the call service bootstrapping methods provided in the embodiments of FIG. 3, FIG. 6, FIG. 8, FIG. 10, FIG. 11A, and FIG. 11B above are suitable for a scenario where the user uses a super call function for the first time when using a tablet computer or a smart watch.

Refer to FIG. 13 which is a flowchart of a call service bootstrapping method according to another embodiment of this application. The method is applied to an electronic device. The electronic device may be a tablet computer or a smart watch. The call service bootstrapping method includes the following steps:

S601: Detect, in response to an operation instruction generated when a phone application is enabled, whether a call function is enabled. S602 is performed if the call function is enabled. S603 is performed if the call function is not enabled. In the another embodiment of this application, the preset application is a Hyper Terminal application, and the call function is a super call function.

S602: Switch a current user interface to a first dialing interface.

S603: Switch the current user interface to a third dialing interface.

Refer to FIG. 14 which is a schematic diagram of a third dialing interface according to an embodiment of this application. The third dialing interface is an inactivated super call interface. The user cannot answer and make calls through the third dialing interface. The third dialing interface includes a phone interface, a contacts interface, and a favorites interface. The phone interface is displayed by default. The phone interface includes a prompt region, a call log region, and a dialing region. The prompt region includes a function introduction and an eighth option of a super call. The eighth option may be an enable option, which may be triggered to perform S102 to S104 or S302 to S310, so as to display the first dialing interface. The call log region includes a call log. The dialing region includes a plurality of numeric keys and an untriggerable dial key. The user may trigger a phone option to control the first dialing interface to display the phone interface, trigger a contacts option to control the first dialing interface to display the contacts interface, or trigger a favorites option to control the first dialing interface to display the favorites interface.

In another embodiment of this application, in response to an operation instruction generated when a phone application is enabled, it is detected whether a preset application is enabled. If the preset application is enabled, it is detected whether a call function is enabled. If the call function is enabled, the current user interface is switched to the first dialing interface. If the present terminal application is not enabled, the current user interface is switched to the third bootstrapping interface, and the third bootstrapping interface is switched to the first dialing interface in response to an operation instruction generated when a third option on the third bootstrapping interface is triggered.

The flowchart of the call service bootstrapping method provided in the embodiment of FIG. 13 above is suitable for a scenario where the user uses a super call function again (not for the first time).

Figure 15:
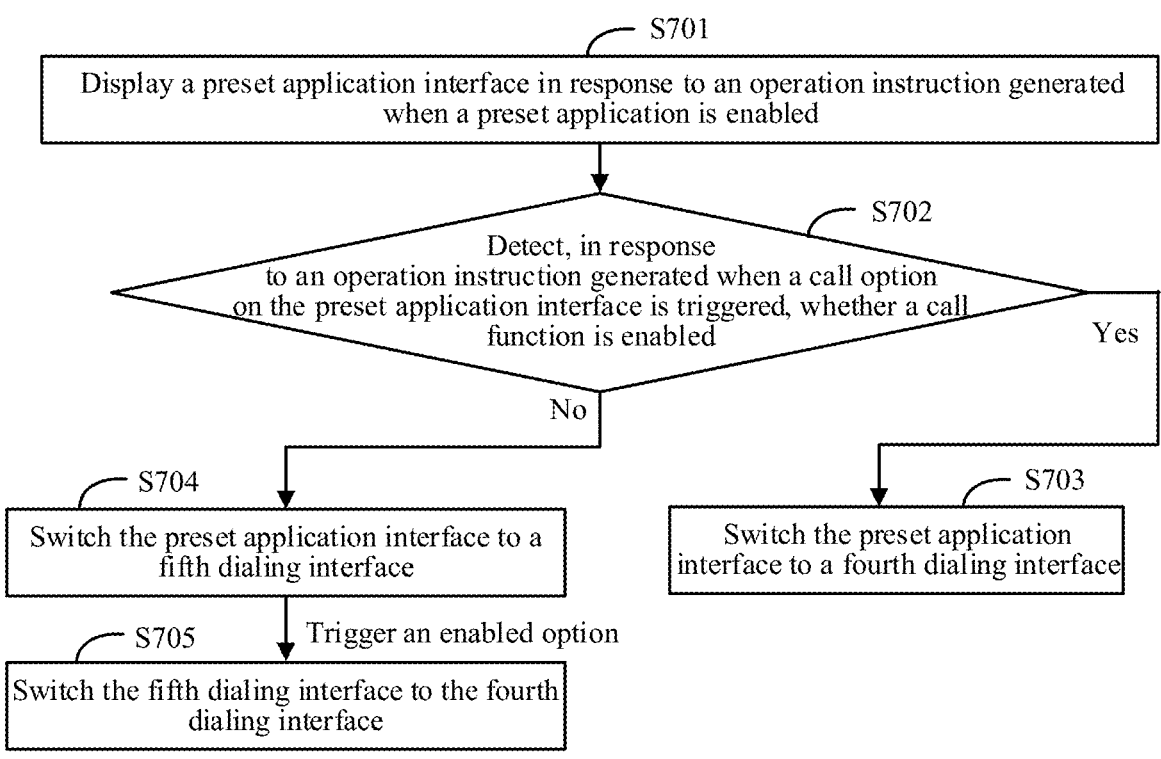
FIG. 15 is a flowchart of a call service bootstrapping method according to another embodiment of this application.

Refer to FIG. 15 which is a flowchart of a call service bootstrapping method according to another embodiment of this application. The method is applied to an electronic device. The electronic device or a notebook computer or a desktop computer. The call service bootstrapping method includes the following steps:

S701: Switch a current user interface to a preset application interface in response to an operation instruction generated when a preset application is enabled.

Figure 16A:
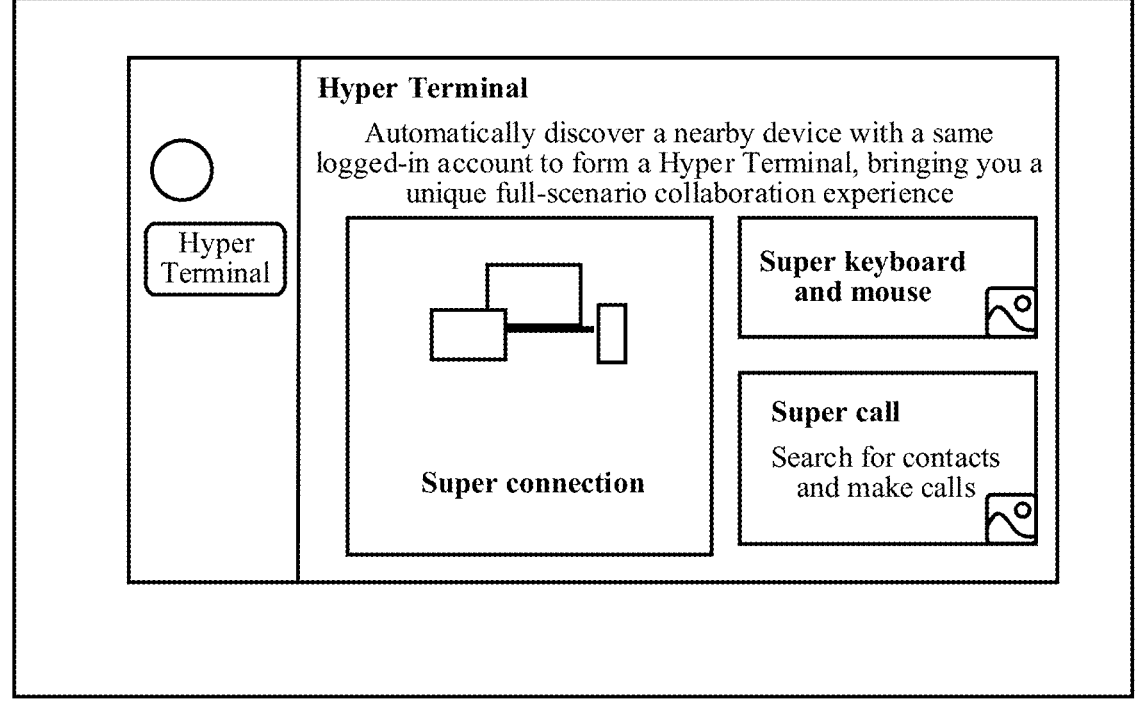
FIG. 16A is a schematic diagram of a preset application interface according to an embodiment of this application.

Refer to FIG. 16A which is a schematic diagram of a preset application interface according to an embodiment of this application. The preset application is a Hyper Terminal application. A Hyper Terminal application interface includes a call option. The call option may be a super call option.

S702: Detect, in response to an operation instruction generated when a call option on the preset application interface is triggered, whether a call function is enabled. S703 is performed if the call function is enabled. S704 is performed if the call function is not enabled. In the another embodiment of this application, the call function is a super call function.

S703: Switch the preset application interface to a fourth dialing interface. In this case, an icon of the fourth dialing interface in a task bar of a computer user interface is the icon of the phone application.

Referring to FIG. 16B, in the another embodiment of this application, the fourth dialing interface is an activated super call interface. The user can answer and make calls through the fourth dialing interface. The fourth dialing interface includes a phone interface and a contacts interface. The phone interface is displayed by default. The phone interface includes a call log region and a dialing region. Contacts information in the call log region may be triggered to call contacts. The dialing region includes a plurality of numeric keys and a triggerable dial key. The plurality of numeric keys are provided for the user to enter a phone number. The dial key is provided for the user to perform an operation of dialing the phone number after entering the phone number. The user may trigger a phone option to control the fourth dialing interface to display the phone interface, or trigger a contacts option to control the fourth dialing interface to display the contacts interface.

S704: Switch the preset application interface to a fifth dialing interface. In this case, an icon of the fifth dialing interface in the task bar of the computer user interface is the icon of the phone application.

Referring to FIG. 16C, in the another embodiment of this application, the fifth dialing interface is an inactivated super call interface. The user cannot answer and make calls through the fifth dialing interface. The fifth dialing interface includes a phone interface and a contacts interface. The phone interface is displayed by default. The phone interface includes a prompt region and a dialing region. The prompt region includes a function introduction and an enable option of a super call. The enable option is triggerable to switch the fifth dialing interface to the fourth dialing interface. The dialing region includes a plurality of numeric keys and an untriggerable dial key. The user may trigger a phone option to control the fifth dialing interface to display the phone interface, or trigger a contacts option to control the fifth dialing interface to display the contacts interface.

S705: Switch the fifth dialing interface to the fourth dialing interface in response to an operation instruction generated when the enable option on the fifth dialing interface is triggered.

Figure 16D:
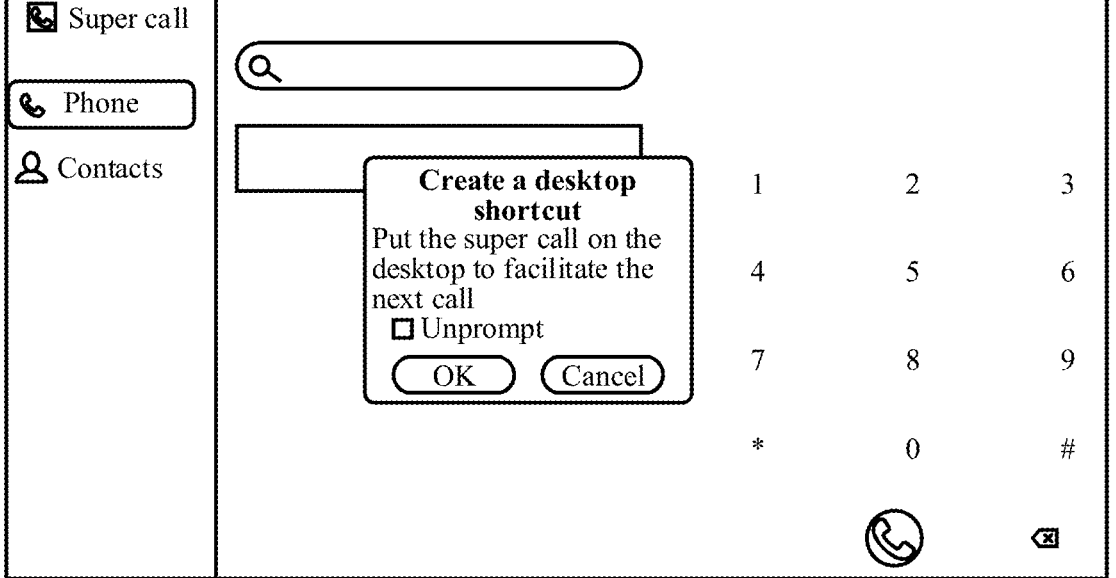
FIG. 16D is a schematic diagram of a sixth bootstrapping interface according to an embodiment of this application.

Refer to FIG. 16D which is a schematic diagram of a sixth bootstrapping interface according to an embodiment of this application. In the another embodiment of this application, a sixth bootstrapping interface is displayed in response to the operation instruction generated when the enable option on the fifth dialing interface is triggered. The sixth bootstrapping interface is used for prompting the user whether to create a shortcut to the phone application. The sixth bootstrapping interface includes an OK option, a cancel option, and an unprompt option.

In another embodiment of this application, the method further includes: switching the fifth dialing interface to the fourth dialing interface in response to an operation instruction generated when the cancel option on the sixth bootstrapping interface is triggered; creating an icon of the phone application on the desktop as a shortcut to the phone application in response to an operation instruction generated when the OK option on the sixth bootstrapping interface is triggered; and no longer displaying the sixth bootstrapping interface in response to an operation instruction generated when the unprompt option on the sixth bootstrapping interface is triggered. The super call function can be quickly enabled through the icon of the phone application.

Figure 17:
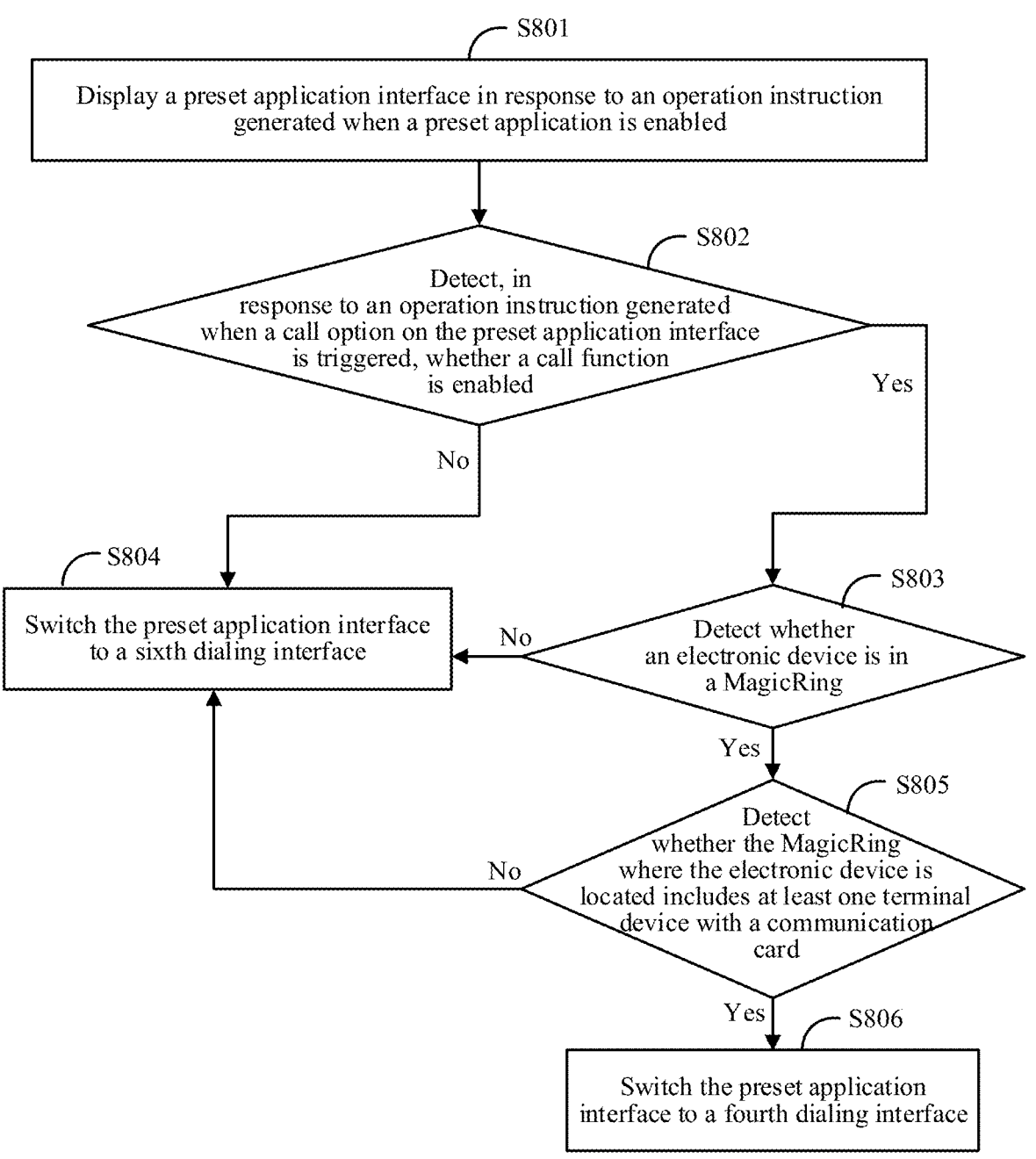
FIG. 17 is a flowchart of a call service bootstrapping method according to another embodiment of this application.

Refer to FIG. 17 which is a flowchart of a call service bootstrapping method according to another embodiment of this application. The method is applied to an electronic device. The call service bootstrapping method includes the following steps:

S801: Switch a preset application interface in response to an operation instruction generated when a preset application is enabled. In the another embodiment of this application, the preset application is a Hyper Terminal application.

S802: Detect, in response to an operation instruction generated when a call option on the preset application interface is triggered, whether a call function is enabled. S803 is performed if the call function is enabled. S804 is performed if the call function is not enabled. In the another embodiment of this application, the call function is a super call function.

S803: Detect whether an electronic device is in a MagicRing. S804 is performed if the electronic device is not in the MagicRing. S805 is performed if the electronic device is in the MagicRing.

S804: Switch the preset application interface to a sixth dialing interface.

Referring to FIG. 18, in the another embodiment of this application, the sixth dialing interface is an inactivated super call interface. The user cannot answer and make calls through the sixth dialing interface. The sixth dialing interface includes a phone interface and a contacts interface. The phone interface is displayed by default. The phone interface includes a prompt region, a call log region, and a dialing region. The prompt region includes prompt information used for prompting that the electronic device is not connected to a terminal device with a communication card. For example, the prompt information may be "Super call, not connected to a mobile phone". The dialing region includes a plurality of numeric keys and a triggerable dial key. The call log region includes a search box and a call log. The search box is provided for the user to enter contacts information to quickly search for a corresponding call log. The call log includes contacts information, such as a remark name, a mobile phone number, a mobile phone model, a communication operator name, and a call time. The plurality of numeric keys and the triggerable dial key are displayed in the dialing region. If the electronic device is not in the MagicRing, a prompt box is displayed when the dial key is triggered, and prompt information is displayed through the prompt box to remind the user that there is no device available for dialing. For example, the prompt information in the prompt box may be "There is no device available for dialing now. At least one mobile phone with a logged-in account needs to be accessed and connected to a same network".

S805: Detect whether the MagicRing where the electronic device is located includes at least one terminal device with a communication card. S806 is performed if the MagicRing where the electronic device is located includes at least one terminal device with a communication card. S804 is performed if the MagicRing where the electronic device is located does not include at least one terminal device with a communication card.

S806: Switch the preset application interface to a fourth dialing interface.

Figure 19:
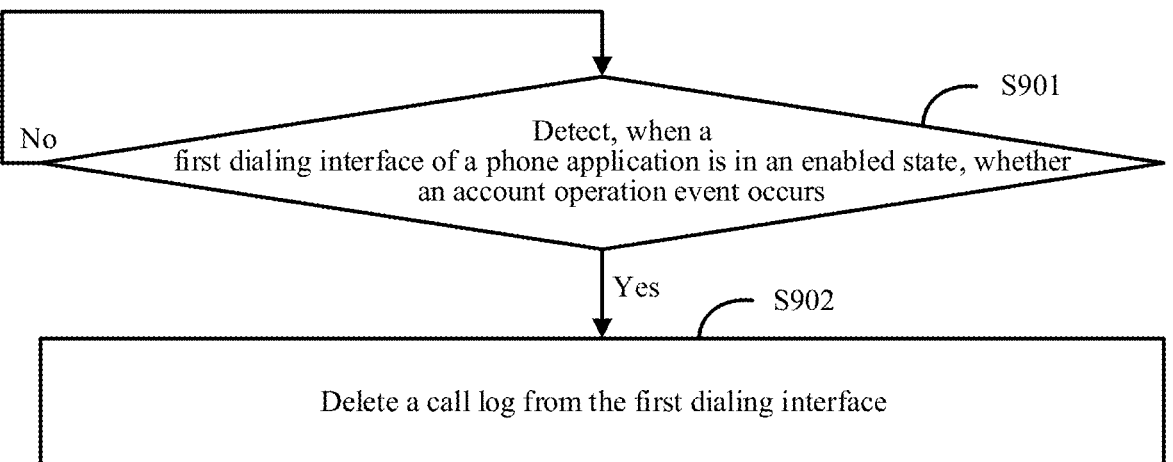
FIG. 19 is a flowchart of a call service bootstrapping method according to another embodiment of this application.

Refer to FIG. 19 which is a flowchart of a call service bootstrapping method according to another embodiment of this application. The method is applied to an electronic device. The call service bootstrapping method includes the following steps:

S901: Detect, when a first dialing interface of a phone application is in an enabled state, whether an account operation event occurs.

In an embodiment of this application, the account operation event includes, but is not limited to, account addition, account deletion, and account change.

S902: Delete a call log from the first dialing interface if the account operation event occurs.

In another embodiment of this application, when an account operation event is detected in a tablet computer or a smart watch, a call log may alternatively be kept, while when an account operation event is detected in a notebook computer or a desktop computer, a call log is cleared.

Figure 20:
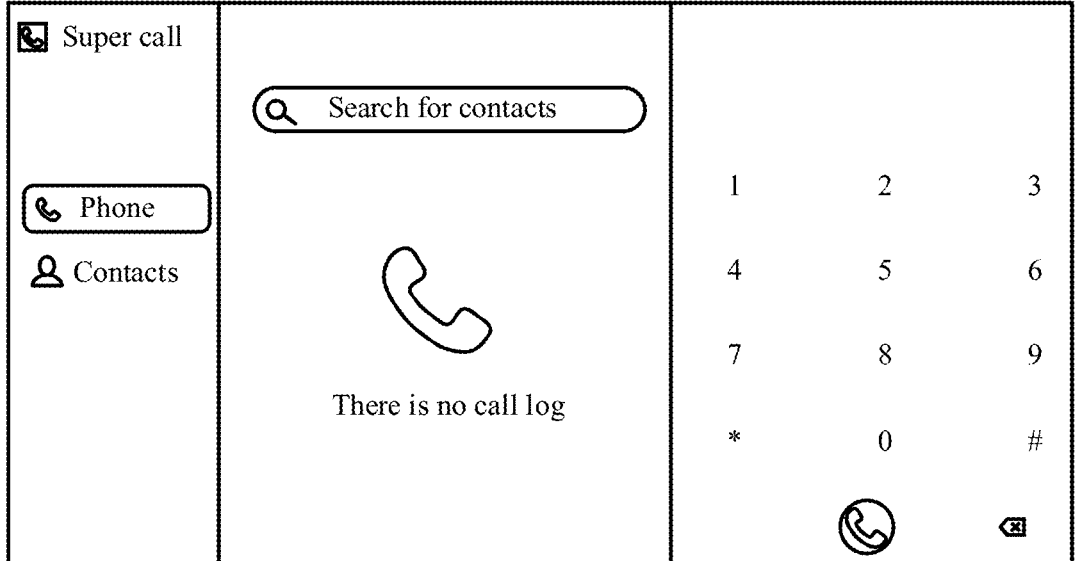
FIG. 20 is a schematic diagram of a first dialing interface from which a call log is cleared according to an embodiment of this application.

Refer to FIG. 20 which is a schematic diagram of a first dialing interface from which a call log is cleared according to an embodiment of this application. In an embodiment of this application, a call log is cleared from first dialing interface if the account operation event occurs.

As shown in FIG. 1A, a phone application that can realize a super call function is pre-installed on a tablet computer. The user may not understand functions and an enabling condition of a super call when enabling the phone application on the tablet computer. Therefore, it is detected whether a Hyper Terminal application is enabled after the user taps the icon to enable the phone application. If the Hyper Terminal application is enabled, it is detected whether the super call function of the tablet computer is enabled. If the super call function is enabled, the second bootstrapping interface (as shown in FIG. 5C) is displayed, and a function introduction and an enabling condition description of the super call are displayed on the second bootstrapping interface. After a MagicRing is formed between the tablet computer and the mobile phone (that is, both have a same logged-in account and are in a same local area network (e.g., Wi-Fi or Bluetooth)), the first dialing interface (as shown in FIG. 5B) is displayed after the user taps the "Got it" option on the second bootstrapping interface. In this case, the user can make a call through the first dialing interface on the premise that the enabling condition of the super call is met. If the super call function is not enabled, the first bootstrapping interface (as shown in FIG. 5A) is displayed, and a function introduction and an enabling condition description of the super call are displayed on the first bootstrapping interface. If the user taps the enable option on the first bootstrapping interface, the first dialing interface is displayed. In this case, the user can make a call through the first dialing interface on the premise that the enabling condition of the super call is met. If the user taps the enable option on the first bootstrapping interface, the second dialing interface (as shown in FIG. 5D) is displayed, the function introduction of the super call is displayed on the second dialing interface, and the enable option is provided for the user to enable the super call function. If the Hyper Terminal application is not enabled, the third bootstrapping interface (as shown in FIG. 9A) is displayed, and a privacy statement of the Hyper Terminal, function introductions of the Hyper Terminal and the super call, and an enabling description of the super call are displayed on the third bootstrapping interface. If the user taps the agree option on the third bootstrapping interface, the first dialing interface is displayed. In this case, the user can make a call through the first dialing interface on the premise that the enabling condition of the super call is met.

As shown in FIG. 1A, a Hyper Terminal application that can realize a super call function is pre-installed on a notebook computer. The user may not understood functions and an enabling condition of a super call when enabling the Hyper Terminal application on the notebook computer. Therefore, after the user taps an icon to enable the Hyper Terminal application, a super call option and a super call function are displayed on a Hyper Terminal application interface. After the user taps the super call option, it is detected whether the super call function of the notebook computer is enabled. If the super call function of the notebook computer is enabled, it is detected whether the notebook computer is in a MagicRing and whether the MagicRing includes at least one mobile phone. If the notebook computer is in the MagicRing and the MagicRing includes at least one mobile phone, the fourth dialing interface is displayed. In this case, the user can make a call through the fourth dialing interface on the premise that the enabling condition of the super call is met. If the notebook computer is not in the MagicRing and the MagicRing does not include any mobile phone, the fifth dialing interface is displayed. The fifth dialing interface shows that the mobile phone is not connected, and when the user tries to make a call, a pop-up prompts that there is no device available for dialing and there is an enabling description of the super call. After the user manually operates to cause the notebook computer to meet the enabling condition of the super call, the fourth dialing interface is displayed, so that the user can make a call through the fourth dialing interface.

Figure 21:
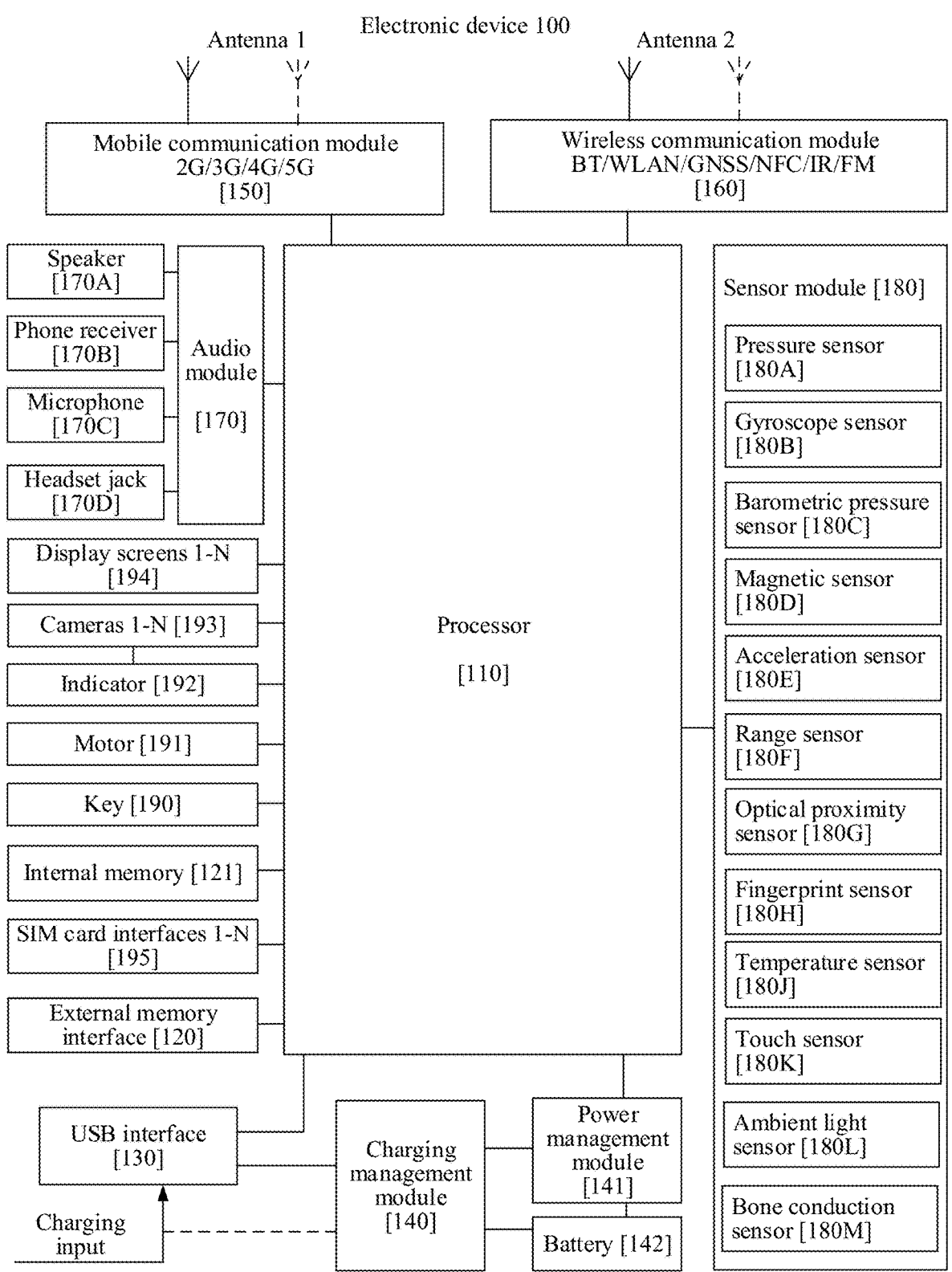
FIG. 21 is an architecture diagram of hardware of an electronic device according to an embodiment of this application.

Referring to FIG. 21, the electronic device 100 may be a mobile phone, a tablet computer, a desktop computer, a laptop computer, a handheld computer, a notebook computer, an ultra-mobile personal computer (Ultra-mobile Personal Computer, UMPC), a netbook, a cellular phone, a personal digital assistant (Personal Digital Assistant, PDA), an augmented reality (Augmented Reality, AR) device, a virtual reality (Virtual Reality, VR) device, an artificial intelligence (Artificial Intelligence, AI) device, a wearable device, an in-vehicle device, a smart home device, and/or a smart city device. A specific type of the electronic device 100 is not particularly limited in the embodiments of this application.

The electronic device 100 may include a processor 110, an external memory interface 120, an internal memory 121, a universal serial bus (Universal Serial Bus, USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (Subscriber Identification Module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components illustrated may be implemented by hardware, software, or a combination of software and hardware.

The processor 110 may include one or more processing units. For example, the processor 110 may include an application processor (Application Processor, AP), a modem processor, a graphics processing unit (Graphics Processing Unit, GPU), an image signal processor (Image Signal Processor, ISP), a controller, a video codec, a digital signal processor (Digital Signal Processor, DSP), a baseband processor, a neural-network processing unit (Neural-Network Processing Unit, NPU), and/or the like. Different processing units may be separate devices, or may be integrated into one or more processors.

The controller may generate an operation control signal according to instruction operation code and a time-sequence signal to complete control of instruction fetching and instruction execution.

A memory may also be disposed in the processor 110, configured to store instructions and data. In some embodiments, the memory in the processor 110 is a cache memory. The memory may store instructions or data recently used or cyclically used by the processor 110. The processor 110, if needing to use the instructions or the data again, may directly invoke the instructions or the data from the memory. Repeated access is avoided, and waiting time of the processor 110 is reduced, thereby improving system efficiency.

In some embodiments, the processor 110 may include one or more interfaces. The interface may include an integrated circuit (Inter-integrated Circuit, I2C) interface, an integrated circuit sound (Inter-integrated Circuit Sound, I2S) interface, a pulse code modulation (Pulse Code Modulation, PCM) interface, a universal asynchronous receiver/transmitter (universal asynchronous receiver/transmitter, UART) interface, a mobile industry processor interface (Mobile Industry Processor Interface, MIPI), a general-purpose input/output (General-Purpose Input/Output, GPIO) interface, a subscriber identity module (Subscriber Identity Module, SIM) interface, a universal serial bus (Universal Serial Bus, USB) interface, and/or the like.

The I2C interface is a bidirectional synchronous serial bus, and includes a serial data line (Serial Data Line, SDA) and a serial clock line (Derail Clock Line, SCL). In some embodiments, the processor 110 may include a plurality of I2C buses. The processor 110 may be coupled to the touch sensor 180K, a charger, a flash, the camera 193, and the like by using different I2C bus interfaces respectively. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be configured to perform audio communication.

The PCM interface may also be configured to perform audio communication, to sample, quantize, and encode an analog signal.

The UART interface is a universal serial data bus and is configured to perform asynchronous communication. The bus may be a bidirectional communications bus. The bus converts data to be transmitted between serial communication and parallel communication.

The MIPI may be configured to connect the processor 110 to a peripheral device such as the display screen 194 or the camera 193. The MIPI includes a camera serial interface (Camera Serial Interface, CSI), a display serial interface (Display Serial Interface, DSI), and the like. In some embodiments, the processor 110 communicates with the display screen 194 by using the DSI interface, to implement a display function of the electronic device 100.

A GPIO interface may be configured by software. The GPIO interface may be configured as a control signal or a data signal.

The USB interface 130 is an interface that complies with the USB standard specification, and may be specifically a Mini USB interface, a Micro USB interface, a USB Type C interface, and the like.

It may be understood that an interface connection relationship between the modules illustrated in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of the interface connection manners.

The electronic device 100 implements a display function by using the GPU, the display screen 194, the application processor, and the like. The GPU is a microprocessor for image processing and connects the display 194 and the application processor. The GPU is configured to perform mathematical and geometric calculations, and is configured to render graphics. The processor 110 may include one or more GPUs that execute a program instruction to generate or change display information.

The display screen 194 is configured to display an image, a video, and the like. The display screen 194 includes a display panel. The display panel may adopt a liquid crystal display (Liquid Crystal Display, LCD), an organic light-emitting diode (Organic Light-Emitting Diode, OLED), an active matrix organic light-emitting diode or an active matrix organic light-emitting diode (Active Matrix Organic Light-Emitting Diode, AMOLED), a flexible light-emitting diode (Flex Light-Emitting Diode, FLED), Miniled, Microled, Micro-OLED, a quantum dot light-emitting diode (Quantum Dot Light Emitting Diodes, QLED), or the like. In some embodiments, the electronic device 100 may include 1 or N display screens 194. N is a positive integer greater than 1.

The digital signal processor is configured to process a digital signal, and in addition to a digital image signal, the digital signal processor may further process another digital signal. For example, when the electronic device 100 performs frequency selection, the digital signal processor is configured to perform Fourier transform and the like on frequency energy.

The internal memory 121 may include one or more random access memories (Random Access Memory, RAM) and one or more non-volatile memories (Non-Volatile Memory, NVM).

The random access memories may include a static-random access memory (Static-Random Access Memory, SRAM), a dynamic random access memory (Dynamic Random Access Memory, DRAM), a synchronous dynamic random access memory (Synchronous Dynamic Random Access Memory, SDRAM), a double data rate synchronous dynamic random access memory (Double Data Rate Synchronous Dynamic Random Access Memory, DDR SDRAM; for example, a fifth generation DDR SDRAM is generally referred to as DDR5 SDRAM), and the like.

The non-volatile memories may include a magnetic disk storage device and a flash memory.

The flash memory may be divided into NOR FLASH, NAND FLASH, 3D NAND FLASH, and the like according to an operation principle, or may be divided into a single-level cell (Single-Level Cell, SLC), a multi-level cell (Multi-Level Cell, MLC), a triple-level cell (Triple-Level Cell, TLC), a quad-level cell (Quad-Level Cell, QLC), and the like according to an electrical potential level of a storage unit, or may be divided into a universal flash storage (Universal Flash Storage, UFS), an embedded multi media card (embedded multi media card, eMMC), and the like according to a storage specification.

The random access memory may be directly read and written by the processor 110, may be configured to store executable programs (for example, machine instructions) of an operating system or other running programs, or may be configured to store data of users and applications.

The non-volatile memory may also store the executable programs, the data of the users and the applications, and the like, and may be loaded into the random access memory in advance for the processor 110 to perform direct reading and writing.

The external memory interface 120 may be configured to connect to an external non-volatile memory, to expand a storage capability of the electronic device 100. The external non-volatile memory communicates with the processor 110 by using the external memory interface 120, to implement a data storage function, for example, storing a file such as a music or a video in the external non-volatile memory.

The internal memory 121 or the external memory interface 120 is configured to store one or more computer programs. The one or more computer programs are configured to be executed by the processor 110. The one or more computer programs include a plurality of instructions. When the plurality of instructions are executed by the processor 110, the call service bootstrapping method performed on the electronic device 100 in the above embodiment may be implemented, to implement a handwriting input display function of the electronic device 100.

The pressure sensor 180A is configured to sense a pressure signal, and may convert the pressure signal into an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may be a parallel plate including at least two conductive materials. When a force is applied to the pressure sensor 180A, a capacitance between electrodes changes. The electronic device 100 determines pressure strength based on a change in the capacitance. When a touch operation is performed on the display screen 194, the electronic device 100 detects intensity of the touch operation according to the pressure sensor 180A. The electronic device 100 may also calculate a touch position based on a detection signal of the pressure sensor 180A. In some embodiments, touch operations that are applied to a same touch position but have different touch operation intensity may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the short message application icon, an instruction of creating a new short message is executed.

The touch sensor 180K is also referred to as a "touch device". The touch sensor 180K may be disposed on the display screen 194. The touch sensor 180K and the display screen 194 form a touchscreen. The touch sensor 180K is configured to detect a touch operation on or near the touch sensor 180K. The touch sensor may transfer the detected touch operation to the application processor to determine a type of the touch event. The touch sensor 180K may provide a visual output related to the touch operation by using the display screen 194. In some other embodiments, the touch sensor 180K may alternatively be arranged on a surface of the electronic device 100 at a position different from that of the display screen 194.

This embodiment further provides a computer storage medium. The computer storage medium stores computer instructions. The computer instructions, when run on the electronic device 100, cause the electronic device 100 to perform steps of the above relevant methods to implement the call service bootstrapping methods in the above embodiments.

This embodiment further provides a computer program product. The computer program product, when run on a computer, causes the computer to perform the related steps, to implement the call service bootstrapping method in the above embodiments.

In addition, an embodiment of this application further provides an apparatus. The apparatus may specifically be a chip, a component, or a module. The apparatus may include a processor and a memory that are connected. The memory is configured to store computer-executable instructions. When the apparatus runs, the processor may execute the computer-executable instructions stored in the memory, to cause the chip to perform the call service bootstrapping method in the above method embodiments.

The electronic device, the computer storage medium, the computer program product, or the chip provided in this embodiment may be configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, only division of the foregoing function modules is taken as an example for illustration. In actual application, the foregoing functions can be allocated to different modules and implemented according to a requirement, that is, an inner structure of an apparatus is divided into different function modules to implement all or part of the functions described above.

In the several embodiments provided in this application, it should be understood that the disclosed apparatus and method may be implemented in other manners. For example, the apparatus embodiment described above is merely exemplary. For example, the module or unit division is merely a logical function division and may be other division during actual implementations. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in multiple different places. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the above embodiments are only intended for describing the technical solutions of this application but not for limiting this application. Although this application is described in detail with reference to the preferred embodiments, a person of ordinary skill in the art should understand that modifications or equivalent replacements can be made to the technical solutions of this application without departing from the spirit and scope of the technical solutions of this application.

What is claimed is:

1. A call service bootstrapping method, comprising:
detecting, in response to an operation instruction generated when a phone application is enabled, whether a call function is enabled;
switching a current user interface to a first bootstrapping interface if the call function is not enabled, the first bootstrapping interface comprising a first option;
switching the first bootstrapping interface to a first dialing interface in response to an operation instruction generated when the first option is triggered; and
switching the current user interface to the first dialing interface if the call function is enabled;
wherein the first bootstrapping interface further comprises a second option, and the method comprises:
switching the first bootstrapping interface to a second dialing interface in response to an operation instruction generated when the second option is triggered;
wherein the second dialing interface is an inactivated super call interface and comprises a phone interface, a contacts interface, and a favorites interface, the phone interface comprising a prompt region and a dialing region, the prompt region comprising a function introduction and an enable option of a super call, the enable option being triggerable to display the first dialing interface, the dialing region comprising a plurality of numeric keys and an untriggerable dial key;
wherein the first dialing interface is an activated super call interface and comprises a phone interface, a contacts interface, and a favorites interface, the phone interface comprising a call log region and a dialing region, the call log region comprising contacts information, the dialing region comprising a plurality of numeric keys and a triggerable dial key.

2. The call service bootstrapping method according to claim 1, wherein the switching the current user interface to the first dialing interface if the call function is enabled comprises:
switching the current user interface to a second bootstrapping interface if the call function is enabled, wherein the second bootstrapping interface comprises a function introduction and a function enabling description of a super call; and switching the second bootstrapping interface to the first dialing interface after the second bootstrapping interface is displayed for a preset time.

3. The call service bootstrapping method according to claim 1, further comprising:
detecting, in response to the operation instruction generated when the first option is triggered, whether a user account is logged into;
switching the first bootstrapping interface to the first dialing interface if the user account is logged into;
switching the first bootstrapping interface to an account login interface if the user account is not logged into; and
switching the account login interface to the first dialing interface in response to an operation instruction generated by account login.

4. The call service bootstrapping method according to claim 1, further comprising:
detecting, in response to the operation instruction generated when the phone application is enabled, whether a preset application is enabled;
detecting, if the preset application is enabled, whether the call function is enabled;
switching the current user interface to the first bootstrapping interface if the call function is not enabled;
switching the first bootstrapping interface to the first dialing interface in response to the operation instruction generated when the first option is triggered;
switching the first bootstrapping interface to the second dialing interface in response to the operation instruction generated when the second option is triggered;
switching the current user interface to the first dialing interface if the call function is enabled;
switching the current user interface to the first bootstrapping interface if the preset application is not enabled;
switching the first bootstrapping interface to a third bootstrapping interface in response to the operation instruction generated when the first option is triggered; and
switching the third bootstrapping interface to the first dialing interface in response to an operation instruction generated when a third option on the third bootstrapping interface is triggered.

5. The call service bootstrapping method according to claim 4, wherein the preset application is a Hyper Terminal application, the third bootstrapping interface is used for bootstrapping a user to enable the Hyper Terminal application, and the third bootstrapping interface comprises a privacy statement and a scrolling display region of the Hyper Terminal application, the scrolling display region comprising a Hyper Terminal function introduction interface, a super call function introduction interface, and a super call function enabling description interface that are scroll-displayed.

6. The call service bootstrapping method according to claim 5, wherein the switching the third bootstrapping interface to the first dialing interface in response to an operation instruction generated when a third option on the third bootstrapping interface is triggered comprises:
switching the third bootstrapping interface to a function interface of the Hyper Terminal application in response to the operation instruction generated when the third option on the third bootstrapping interface is triggered; and
switching the function interface of the Hyper Terminal application to the first dialing interface in response to an operation instruction generated when a back option on the function interface of the Hyper Terminal application is triggered.

7. The call service bootstrapping method according to claim 4, further comprising:

detecting, in response to the operation instruction generated when the phone application is enabled, whether a privacy statement of the preset application is accepted;

detecting, if the privacy statement of the preset application is accepted, whether a user account is logged into;

detecting, if the user account is logged into, whether the call function is enabled;

switching the current user interface to the first dialing interface if the call function is enabled;

switching the current user interface to the first bootstrapping interface if the call function is not enabled;

switching the first bootstrapping interface to the first dialing interface in response to the operation instruction generated when the first option is triggered; and switching the first bootstrapping interface to the second dialing interface in response to the operation instruction generated when the second option is triggered.

8. The call service bootstrapping method according to claim 7, further comprising:

switching the current user interface to a fourth bootstrapping interface if the user account is not logged into;

switching the fourth bootstrapping interface to an account login interface in response to an operation instruction generated when a fourth option on the fourth bootstrapping interface is triggered;

switching the account login interface to the first dialing interface in response to an operation instruction generated by account login; and switching the fourth bootstrapping interface to the second dialing interface in response to an operation instruction generated when a fifth option on the fourth bootstrapping interface is triggered.

9. The call service bootstrapping method according to claim 8, further comprising:

detecting, if the privacy statement of the preset application is not accepted, whether the user account is logged into;

switching the current user interface to a fifth bootstrapping interface if the user account is logged into;

switching the fifth bootstrapping interface to the first dialing interface in response to an operation instruction generated when a sixth option on the fifth bootstrapping interface is triggered; and switching the fifth bootstrapping interface to the second dialing interface in response to an operation instruction generated when a seventh option on the fifth bootstrapping interface is triggered.

10. The call service bootstrapping method according to claim 9, further comprising:

switching the current user interface to the fifth bootstrapping interface if the user account is not logged into;

switching the fifth bootstrapping interface to the account login interface in response to the operation instruction generated when the sixth option on the fifth bootstrapping interface is triggered;

switching the account login interface to the first dialing interface in response to the operation instruction generated by account login; and switching the fifth bootstrapping interface to the second dialing interface in response to the operation instruction generated when the seventh option on the fifth bootstrapping interface is triggered.

11. The call service bootstrapping method according to claim 10, further comprising:

switching the current user interface to a preset application interface in response to an operation instruction generated when the preset application is enabled;

detecting, in response to an operation instruction generated when a call option on the preset application interface is triggered, whether the call function is enabled;

switching the preset application interface to a fourth dialing interface if the call function is enabled;

switching the preset application interface to a fifth dialing interface if the call function is not enabled; and switching the fifth dialing interface to the fourth dialing interface in response to an operation instruction generated when an enable option on the fifth dialing interface is triggered.

12. The call service bootstrapping method according to claim 11, wherein the fourth dialing interface is an activated super call interface, and the fourth dialing interface comprises a phone interface and a contacts interface, the phone interface comprising a call log region and a dialing region, the call log region comprising contacts information, the dialing region comprising a plurality of numeric keys and a triggerable dial key.

13. The call service bootstrapping method according to claim 11, wherein the fifth dialing interface is an inactivated super call interface, and the fifth dialing interface comprises a phone interface and a contacts interface, the phone interface comprising a prompt region and a dialing region, the prompt region comprising a function introduction and an enable option of a super call, the enable option being triggerable to switch the fifth dialing interface to the fourth dialing interface, the dialing region comprising a plurality of numeric keys and an untriggerable dial key.

14. The call service bootstrapping method according to claim 13, further comprising:

displaying a sixth bootstrapping interface in response to the operation instruction generated when the enable option on the fifth dialing interface is triggered;

switching the fifth dialing interface to the fourth dialing interface in response to an operation instruction generated when a cancel option on the sixth bootstrapping interface is triggered; and creating a shortcut to the phone application in response to an operation instruction generated when an OK option on the sixth bootstrapping interface is triggered.

15. The call service bootstrapping method according to claim 11, wherein the switching the preset application interface to a fourth dialing interface if the call function is enabled comprises:

detecting, if the call function is enabled, whether an electronic device is in a MagicRing;

switching the preset application interface to a sixth dialing interface if the electronic device is not in the MagicRing;

detecting, if the electronic device is in the MagicRing, whether the MagicRing where the electronic device is located comprises at least one terminal device with a communication card;

switching the preset application interface to the fourth dialing interface if the MagicRing where the electronic device is located comprises at least one terminal device with a communication card; and switching the preset application interface to the sixth dialing interface if the MagicRing where the electronic device is located does not comprise at least one terminal device with a communication card.

16. The call service bootstrapping method according to claim 15, wherein the sixth dialing interface is an inactivated super call interface, the sixth dialing interface comprises a phone interface and a contacts interface, the phone interface comprising a prompt region, a call log region, and a dialing region, the prompt region comprising prompt information used for prompting that the electronic device is not connected to a terminal device with a communication card, the dialing region comprising a plurality of numeric keys and a triggerable dial key, the call log region comprising a search box and a call log, the search box allowing a user to enter contacts information to search the call log, the call log comprising contacts information, the plurality of numeric keys and the triggerable dial key being displayed in the dialing region, and if the electronic device is not in the MagicRing or the MagicRing does not comprise a terminal device with a communication card, pop-up prompt information is displayed when the dial key is triggered.

17. The call service bootstrapping method according to claim 9, wherein both the fourth bootstrapping interface and the fifth bootstrapping interface comprise a scrolling display region and a privacy statement, wherein the scrolling display region is used for scroll-displaying a Hyper Terminal function introduction, a super call function introduction, and a super call function enabling description.

18. The call service bootstrapping method according to claim 1, further comprising:

detecting, when the first dialing interface of the phone application is in an enabled state, whether an account operation event occurs; and deleting a call log from the first dialing interface if the account operation event occurs.

19. An electronic device, comprising: a memory and a processor, wherein the memory is configured to store program instructions; and the processor is configured to read and execute the program instructions stored in the memory, and the program instructions, when executed by the processor, cause the electronic device to perform:

detecting, in response to an operation instruction generated when a phone application is enabled, whether a call function is enabled;

switching a current user interface to a first bootstrapping interface if the call function is not enabled, the first bootstrapping interface comprising a first option and a second option;

switching the first bootstrapping interface to a first dialing interface in response to an operation instruction generated when the first option is triggered;

switching the current user interface to the first dialing interface if the call function is enabled; and switching the first bootstrapping interface to a second dialing interface in response to an operation instruction generated when the second option is triggered;

wherein the second dialing interface is an inactivated super call interface and comprises a phone interface, a contacts interface, and a favorites interface, the phone interface comprising a prompt region and a dialing region, the prompt region comprising a function introduction and an enable option of a super call, the enable option being triggerable to display the first dialing interface, the dialing region comprising a plurality of numeric keys and an untriggerable dial key;

wherein the first dialing interface is an activated super call interface and comprises a phone interface, a contacts interface, and a favorites interface, the phone interface comprising a call log region and a dialing region, the call log region comprising contacts information, the dialing region comprising a plurality of numeric keys and a triggerable dial key.

20. A non-transitory computer storage medium, comprising program instructions, the program instructions, when run on an electronic device, causing the electronic device to perform:

detecting, in response to an operation instruction generated when a phone application is enabled, whether a call function is enabled;

switching a current user interface to a first bootstrapping interface if the call function is not enabled, the first bootstrapping interface comprising a first option and a second option;

switching the first bootstrapping interface to a first dialing interface in response to an operation instruction generated when the first option is triggered;

switching the current user interface to the first dialing interface if the call function is enabled; and switching the first bootstrapping interface to a second dialing interface in response to an operation instruction generated when the second option is triggered;

wherein the second dialing interface is an inactivated super call interface and comprises a phone interface, a contacts interface, and a favorites interface, the phone interface comprising a prompt region and a dialing region, the prompt region comprising a function introduction and an enable option of a super call, the enable option being triggerable to display the first dialing interface, the dialing region comprising a plurality of numeric keys and an untriggerable dial key;

wherein the first dialing interface is an activated super call interface and comprises a phone interface, a contacts interface, and a favorites interface, the phone interface comprising a call log region and a dialing region, the call log region comprising contacts information, the dialing region comprising a plurality of numeric keys and a triggerable dial key.

* * * * *